(12) United States Patent
Sato et al.

(10) Patent No.: US 7,650,359 B2
(45) Date of Patent: *Jan. 19, 2010

(54) CONTENT REPRODUCTION APPARATUS AND CONTENT REPRODUCTION METHOD

(75) Inventors: Hideaki Sato, Yokohama (JP);
Toshinari Takahashi, Minato-ku (JP);
Tooru Kamibayashi, Chigasaki (JP);
Toshimitsu Kaneko, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 626 days.

This patent is subject to a terminal disclaimer.

(21) Appl. No.: 11/435,610

(22) Filed: May 17, 2006

(65) Prior Publication Data

US 2006/0212697 A1 Sep. 21, 2006

Related U.S. Application Data

(63) Continuation of application No. PCT/JP2006/301936, filed on Jan. 31, 2006.

(30) Foreign Application Priority Data

Jan. 31, 2005 (JP) ............................. 2005-024584

(51) Int. Cl.
*G06F 7/00* (2006.01)
*G06F 17/00* (2006.01)
(52) U.S. Cl. .................... 707/102; 709/203; 713/150
(58) Field of Classification Search ........................ None
See application file for complete search history.

(56) References Cited

U.S. PATENT DOCUMENTS 6,580,870 B1 6/2003 Kanazawa et al.
6,961,849 B1 * 11/2005 Davis et al. ................. 713/167

(Continued)

FOREIGN PATENT DOCUMENTS

JP 11-161663 6/1999

(Continued)

OTHER PUBLICATIONS

International Search Report for JP/2006/301936 dated Jun. 28, 2006.

(Continued)

*Primary Examiner*—Mohammad Ali
*Assistant Examiner*—Angelica Ruiz
(74) *Attorney, Agent, or Firm*—Turocy & Watson, LLP

(57) ABSTRACT

A content reproduction apparatus (a) reads a specific server identifier, from a recording medium storing the specific server identifier and a content data item including a destination identifier, to store the specific server identifier in a table, (b) certifies a server corresponding to the specific server identifier, (c) certifies the recording medium by use of a data item in a storage area of the recording medium designated by the server being certified, (d) reproduces the content data item stored in the recording medium, (e) acquires the destination identifier while reproducing the content data item, (f) determines whether the destination identifier being acquired is equal to the specific identifier stored in the table, and (g) accesses to the server when the destination identifier being acquired is equal to the specific server identifier, and the server and the recording medium are certified.

25 Claims, 18 Drawing Sheets

U.S. PATENT DOCUMENTS

| | | | |
|---|---|---|---|
| 7,353,250 B2 * | 4/2008 | Chung et al. | 709/203 |
| 7,386,587 B2 * | 6/2008 | Chung et al. | 709/203 |
| 7,424,613 B2 * | 9/2008 | Han et al. | 713/168 |
| 2002/0143902 A1 * | 10/2002 | Chung et al. | 709/219 |
| 2003/0185395 A1 * | 10/2003 | Lee et al. | 380/277 |
| 2004/0126095 A1 | 7/2004 | Tsumagari et al. | |
| 2005/0034054 A1 * | 2/2005 | Tsuyama et al. | 715/500 |
| 2005/0086514 A1 * | 4/2005 | Han et al. | 713/200 |

FOREIGN PATENT DOCUMENTS

JP     2004-079055     3/2004

OTHER PUBLICATIONS

Written Opinion for PCT/JP2006/301936 dated Jun. 28, 2006.

* cited by examiner

Destination management table

| Domain name | Server certification flag | Disk certification flag |
|---|---|---|
| www.sample.com | 1 | 1 |

FIG. 18

CONTENT REPRODUCTION APPARATUS AND CONTENT REPRODUCTION METHOD

CROSS REFERENCE TO RELATED APPLICATIONS

This is a Continuation Application of PCT Application No. PCT/JP2006/301936, filed Jan. 31, 2006, which was published under PCT Article 21(2) in English.

This application is based upon and claims the benefit of priority from prior Japanese Patent Application No. 2005-024584, filed Jan. 31, 2005, the entire contents of which are incorporated herein by reference.

BACKGROUND OF THE INVENTION

1. Field of the Invention

The present invention relates to a content reproduction apparatus which reproduces and executes content data including video/audio information and a program recorded on a recording medium such as an optical disk, and more particularly, it relates to a content reproduction apparatus which accesses a server via a network.

2. Description of the Related Art

In recent years, there have been developed optical disk reproduction apparatuses to reproduce optical disks such as DVDs and video CDs in which data such as video and audio are recorded. These apparatuses are utilized in viewing movie software and the like, and they generally prevail.

The DVD is a specification concerning a disk which reproduces video/audio information recorded in an information recording medium, and has been issued as "DVD Specifications for Read-Only disk Part 3: VIDEO SPECIFICATIONS" by DVD Forum in 1996. In this specification, an MPEG 2 system is supported as a moving image compression system, and an MPEG audio compression system and an AC-3 audio compression system are supported as audio compression systems. Furthermore, there are defined: sub-video data which is bitmap data for use in a movie subtitle or the like; and control data (navigation pack) of quick forward reproduction, quick return reproduction or the like.

On the other hand, in recent years, with the prevalence of the Internet, there has been developed a video information device having a network access function. For example, in the video information device having a function of receiving and recording television broadcasting, there is developed a function of receiving data of an electronic program table from a server accessed via a network, and recording the broadcasting based on contents of the data.

As a conventional technology concerning the video information device having the network access function, there is disclosed an image display device which provides a service constituted of a DVD video title and an HTML file provided via the Internet in Document 1 (Jpn. Pat. Appln. KOKAI Publication No. 11-161663). In this image display device, it is possible to access the Internet based on URL taken out of the navigation pack and display an HTML content in conjunction with a scene being reproduced.

Moreover, in Document 2 (Jpn. Pat. Appln. KOKAI Publication No. 2004-79055), there is disclosed an optical disk device which not only displays the HTML content but also reproduces video having a high representation capability in accordance with extension information acquired from the server accessed via a communication circuit and which sends data in an optical disk to the server to perform certification processing so that the unspecified number of people cannot access the server.

However, in Document 1, there is not investigated a security problem caused when the content is acquired via the network. In Document 2, the certification processing is simply performed in order to limit the optical disk devices which can access the server, and there is no consideration of: a problem concerning a danger of acquiring a dangerous content maliciously prepared by the server of a destination; or a problem concerning a danger that the optical disk device becomes a steppingstone for an attack of distributed denial of service (DDoS), when the maliciously prepared dangerous content is reproduced. In the document, the security is insufficiently investigated.

As described above, in the conventional video information device having the network access function, the disk is certified to simply assure validity of the disk in order to limit the video information device which can access the server. Therefore, there is no consideration of: the problem concerning the danger of acquiring the dangerous content maliciously prepared by the server of the destination; or the problem concerning the danger that the video information device becomes the steppingstone for the DDoS attack or the like, when the maliciously prepared dangerous content is reproduced, and there is a problem that it is not possible to access the network with security.

Therefore, in view of the above-described problems, an object of the present invention is to provide a content reproduction apparatus and method capable of avoiding execution or reproduction of a disk on which tampered content data is recorded, and limiting a server to be accessed during the reproduction or the execution of the content data or program recorded on the disk.

BRIEF SUMMARY OF THE INVENTION

According to embodiments of the present invention, a content reproduction apparatus (a) reads a specific server identifier, from a recording medium storing the specific server identifier and a content data item including a destination identifier, to store the specific server identifier in a table; (b) certifies a server corresponding to the specific server identifier; (c) certifies the recording medium by use of a data item in a storage area of the recording medium designated by the server being certified; (d) reproduces the content data item stored in the recording medium;(e) acquires the destination identifier while reproducing the content data item; (f) determines whether the destination identifier being acquired is equal to the specific identifier stored in the table; and (g) accesses to the server when the destination identifier being acquired is equal to the specific server identifier, and the server and the recording medium are certified.

BRIEF DESCRIPTION OF THE SEVERAL VIEWS OF THE DRAWING

FIG. 18 is a diagram showing one example of a destination management table stored in a destination management unit.

DETAILED DESCRIPTION OF THE INVENTION

An embodiment of the present invention will be described hereinafter with reference to the drawings.

Figure 1:
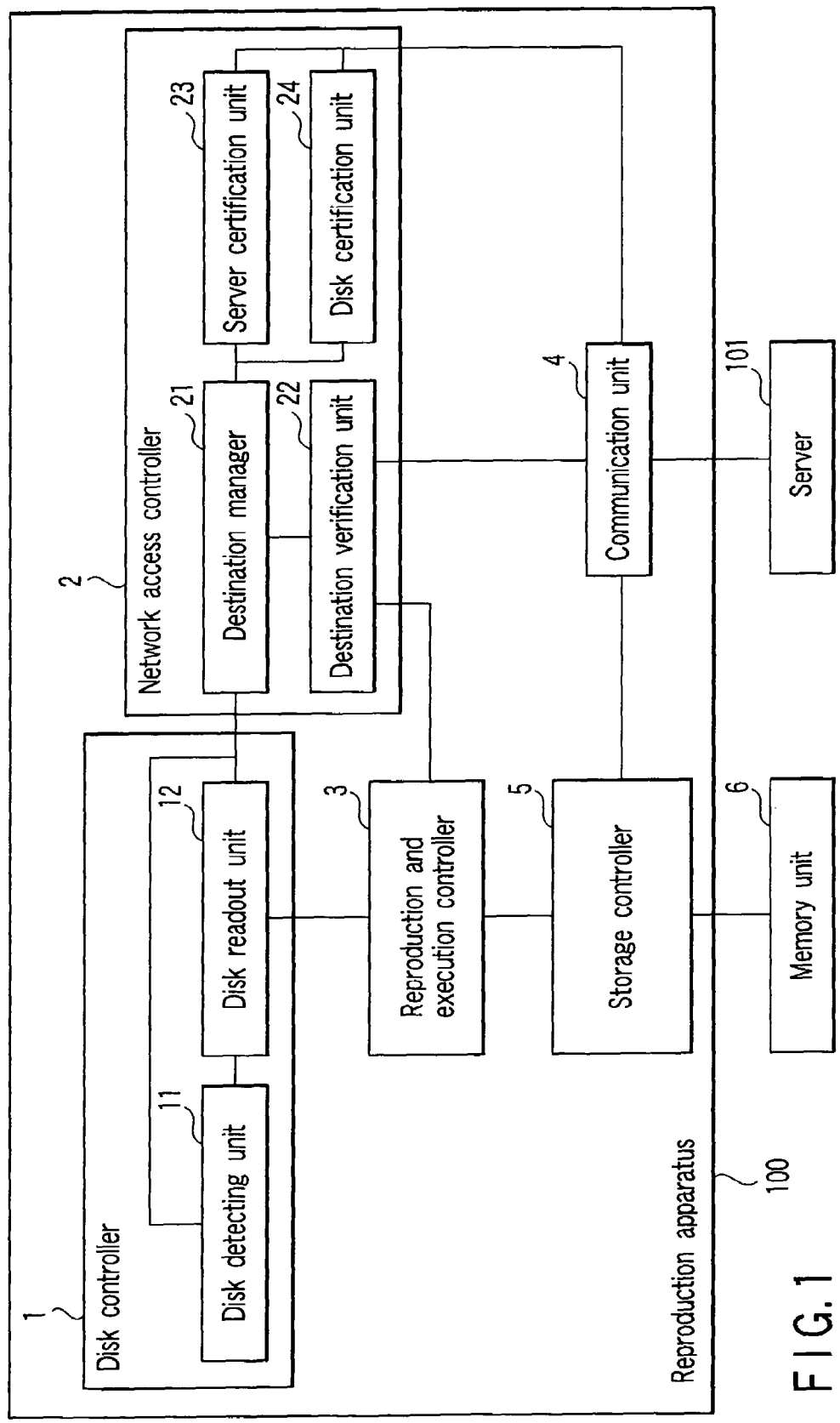
FIG. 1 is a diagram showing a constitution example of a content reproduction apparatus in an embodiment of the present invention.

FIG. 1 shows a constitution example of a content reproduction apparatus (a reproduction apparatus) which reproduces content data recorded in a recording medium in one embodiment of the present invention. Here, there will be described the content reproduction apparatus which reproduces the content data recorded on a disk in a case where the recording medium is a disk such as an optical disk.

In the disk, there is recorded the content data including video/audio data, executable program (script) in which a series of processing procedure is described using a language such as an extensible markup language (XML) or the like.

The disk on which the content data is recorded is inserted into the reproduction apparatus, and the reproduction apparatus has a function of reproducing the video/audio data recorded on the disk, a function of executing the program, and a function of accessing a predetermined network such as internet. The program recorded on the disk includes an identifier (e.g., domain name) of the server of the destination, and program including process to connect the reproduction apparatus to the server. According to the program stored on the disk, data, program or the like for use in reproducing the video/audio data is downloaded from the server (the server corresponds to the identifier included in the program, and this server corresponds to the identifier stored in a specific area of the disk, if the disk is valid).

In the present embodiment, one server on a network is assigned to each type (each content title) of the content data recorded on the valid disk provided from a distributor which records the content data on the recording medium (e.g., disk) to sell or supply the medium. That is, the content title of content data recorded on the valid disk has a one-to-one correspondence with the server. The identifier (e.g., the domain name here) of the server corresponding to the content data recorded on the disk is recorded in a predetermined specific area of the disk.

Moreover, one server corresponds to one title of content data in one case, and pluralities of servers correspond to one title. In the latter case, the identifiers of the pluralities of servers are recorded in the specific area of the disk.

When the content data (including the program) on the disk is not tampered, and the server corresponding to the identifier stored on the specific area of the disk is valid, the identifier of the server stored in the specific area on the valid disk (that is not tampered) indicates the predetermined server corresponding to (the title of) the content data on the disk, and the identifier of the server of the destination included in the program on the disk is equivalent to the identifier (any of a plurality of identifiers in a case where they are stored) stored in the specific area of the disk.

<Constitution>

As shown in FIG. 1, the reproduction apparatus includes a disk controller 1, a network access controller 2, a reproduction/execution controller 3, a communication unit 4, and a storage controller 5.

The disk controller 1 detects that the disk has been inserted, and reads information recorded on the disk. The reproduction/execution controller 3 reproduces or executes video/audio data or program read by the disk controller 1. The communication unit 4 communicates with a server via a network.

The network access controller 2 executes a control for accessing a server 101 corresponding to the disk (content data recorded on the disk) being reproduced by the reproduction/execution controller 3, and performs server certification (described later) and disk certification (described later). The network access controller 2 includes a destination management unit 21, a destination verification unit 22, a server certification unit 23, and a disk certification unit 24.

The storage controller 5 performs a control for storing data (including the video/audio data, the program, etc.) acquired from the disk inserted into the reproduction apparatus or a network (server 101) in a predetermined memory unit 6.

A processing operation of the reproduction apparatus of FIG. 1 will be described hereinafter.

<Server Certification and Disk Certification>

In the present embodiment, one-to-one correspondence is established between the type of content data recorded in a valid disk and the server. A domain name of the server corresponding to the content data recorded on the disk is recorded in a predetermined specific area of the disk.

To limit the server which can be accessed at a time when the reproduction apparatus reproduces the disk to the only server corresponding to the domain name stored in the specific area of the disk, the reproduction apparatus performs the server certification in order to determine whether or not the server is a valid server corresponding to the domain name stored in the specific area on the disk before accessing the server.

Moreover, after performing the server certification, the reproduction apparatus performs the disk certification for verifying validity of the disk in order to prevent the reproduction apparatus from executing the tampered program to access an illegal server in a case where the content data (program included especially in the content data) recorded on the disk is tampered.

The server certification and the disk certification are performed, when the disk is inserted into the content reproduction apparatus, or when a request for accessing the server (network) is (first) occurred and detected (e.g., by executing the program recorded on the disk) after the disk is inserted into the reproduction apparatus.

(1) There will be described a case where the server certification and the disk certification are performed at a time when the disk is inserted into the reproduction apparatus with reference to flowcharts shown in FIGS. 2 to 4.

(1-1) Server Certification

Figure 2:
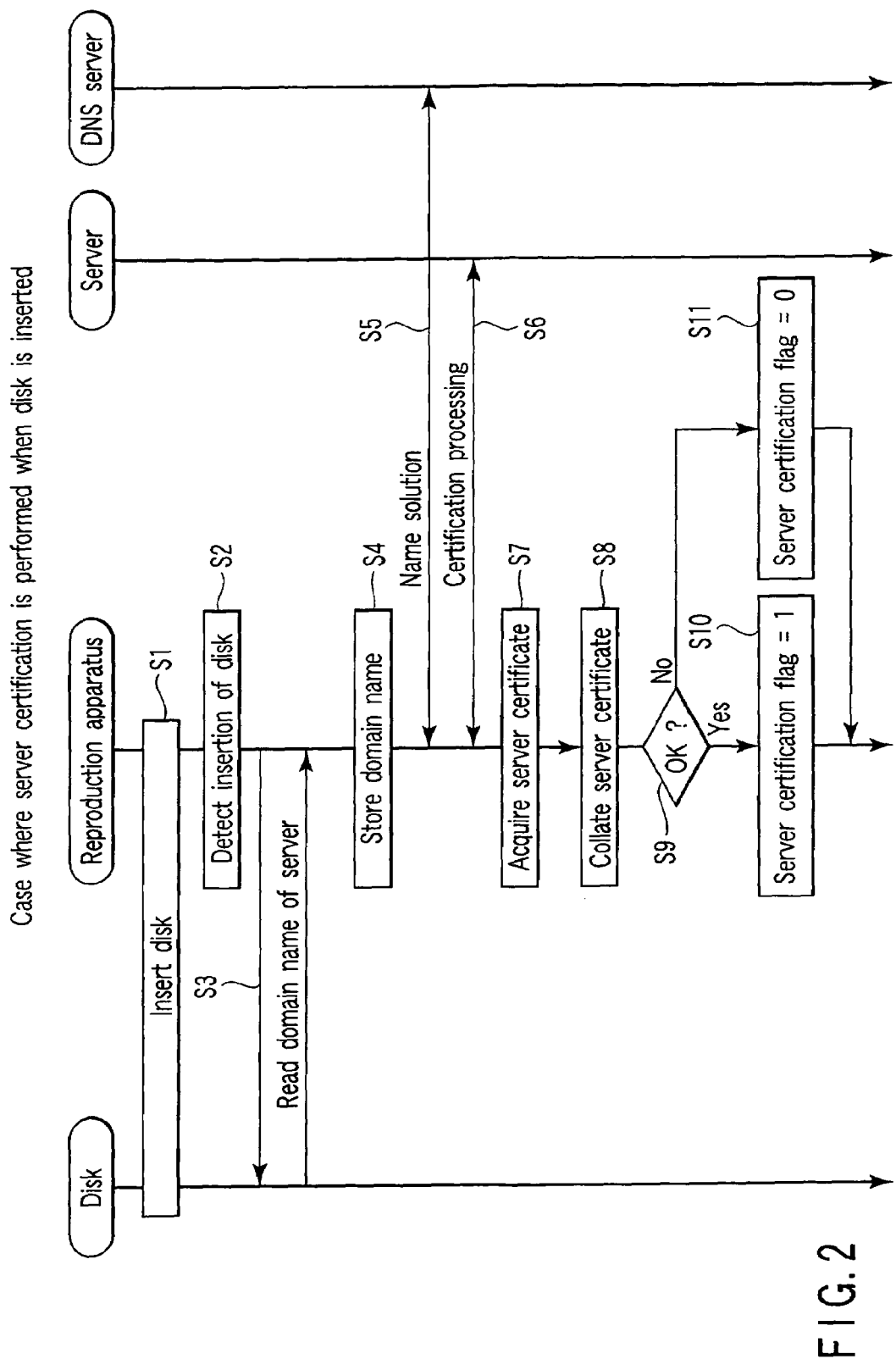
FIG. 2 is a flowchart showing a server certification processing operation (server certification performed at a time when a disk is inserted)

As shown in FIG. 2, when the disk is inserted into a reproduction apparatus 100 (step S1), a disk detection unit 11 detects that the disk has been inserted (step S2). On receiving this information, a disk readout unit 12 reads the domain name of the destination from the predetermined specific area of the disk (step S3). The read domain name is notified to the destination management unit 21 of the network access controller 2. The destination management unit 21 records the notified domain name in a destination management table stored in a memory of the destination management unit 21 as shown in FIG. 18 (step S4). It is to be noted that in a case where data (e.g., "0") indicating that the domain name is vacant is stored in the specific area of the disk, the server certification is not performed. Therefore, even in a case where a request for access to the network is thereafter occurred when the disk is reproduced, the network is not accessed.

The destination management unit 21 stores the domain name in the destination management table only while the disk is inserted into the reproduction apparatus 100. Therefore, when the disk detection unit 11 detects that the disk is taken out, the destination management unit 21 deletes the domain name stored in the step S4 from the destination management table shown in FIG. 18.

Additionally, when the domain name read from the specific area of the disk is stored in the destination management table in the step S4, the server certification unit 23 starts certification processing of the server corresponding to the domain name. In this case, the communication unit 4 first acquires an IP address corresponding to the domain name from a predetermined domain name system (DNS) server (step S5). The server certification unit 23 accesses the network by use of this acquired IP address to perform the certification processing for acquiring the certificate of the server corresponding to the domain name (step S6).

A system to certify the server via the network is operated by a secure socket layer (SSL)/transport layer security (TLS) broadly used in, for example, a worldwide web (WWW) and the like on the internet. The SSL/TLS is a certification system based on a public key cryptograph system. In the system, a client receives the server certificate certified by a certification institution called Route Certification Agency, and confirms contents of the certificate to thereby assure validity of the server. Furthermore, the SSL/TLS defines a communication processing procedure in which the data is encrypted by both of the client and the server, and the data can be prevented from being tampered by tapping on the network.

Figure 3:
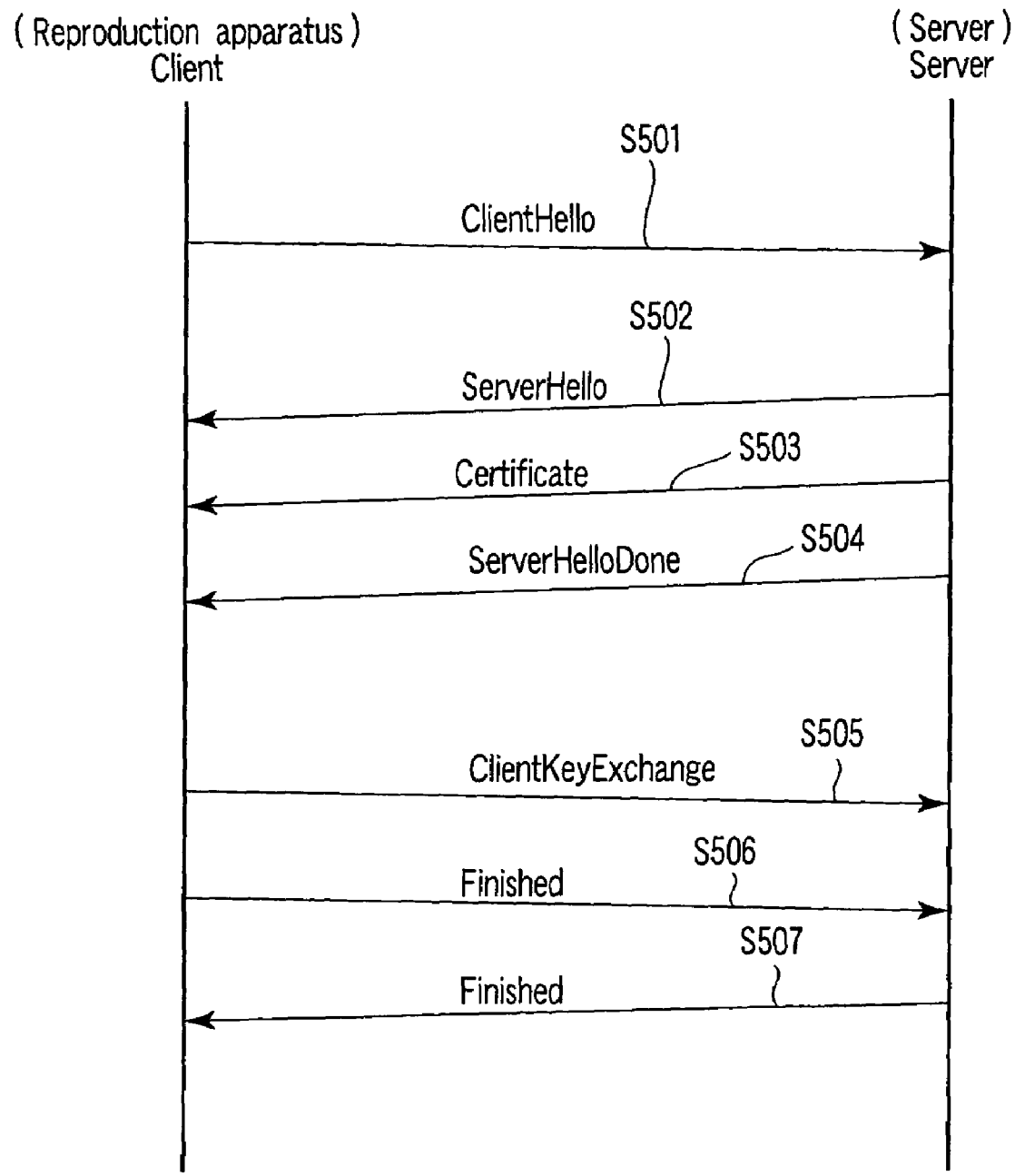
FIG. 3 is a diagram showing one example of a certification procedure for use in the server certification.

In the SSL/TLS, a system is defined to exchange the certificate in a procedure shown in FIG. 3. That is, ClientHello message including a list of usable cryptograph algorithms and the like is transmitted from the client (content reproduction apparatus 100) to the server (server 101) (step S501). Next, the server transmits, to the client, ServerHello message including information indicating the cryptograph algorithm to be used among the cryptograph algorithms of the list (step S502). Thereafter, Certificate message including the server certificate is transmitted to the client (step S503), and ServerHelloDone message is transmitted, thereby ending the transmission of the certificate (step S504).

The client encrypts a common key by use of the public key of the server acquired from the certificate transmitted from the server, and transmits, to the server, ClientKeyExchange message including the encrypted common key (step S505). Next, a digest of the messages up to now is calculated in order to prevent the messages from being tampered, and Finished message including the digest is transmitted to the server (step S506). On the other hand, the server acquires the common key, and calculates the digest of the messages in the same manner as in the client to transmit the digest to the client (step S507).

In FIG. 3, the reproduction apparatus 100 is regarded as the client, and the reproduction apparatus 100 acquires the certificate (server certificate) of the server corresponding to the domain name read from the specific area of the disk in step S503 (step S7).

An accessed server name is collated with the server name included in the server certificate acquired from the server 101 (step S8). When both of the names agree with each other, and the certification of the server is successful, it is determined that the server 101 is a valid server corresponding to the domain name stored in the specific area of the disk inserted in the content reproduction apparatus 100. When the accessed server name does not agree with the server name included in the server certificate acquired from the server 101, it is determined that the certification of the server has failed.

In the step S8, the acquired certificate may be collated with the specific certificate stored beforehand in a memory included in the server certification unit 23. In this case when the acquired certificate agrees with the specific certificate, the server is determined to be valid, and when the acquired certificate dose not agrees with the specific certificate, it is determined that the certification of the server has failed.

The server certification unit 23 records a value of a server certification flag indicating whether or not the server certification is successful in the destination management table stored in the destination management unit 21 and shown in FIG. 18. When the server certification is successful (step S9), the value of the server certification flag is set to "1" (step S10). When the server certification fails (step S10), the value of the server certification flag is set to "0" (step S11).

When the server certification flag indicates "1", it is indicated that the server 101 is valid. Therefore, when the validity of the server cannot be confirmed, the server certification flag is reset to "0". For example, in a case where a communication session is cut from the server which has succeeded in the server certification, or a predetermined certain time has elapsed, the server certification unit 23 rewrites the server certification flag from "1" to "0".

The certification processing of the step S6 of FIG. 2 may be unique certification processing based on a public key cryptograph system instead of the SSL/TLS. A processing procedure in this case will be described.

First, the disk readout unit 12 of the disk controller 1 reads the public key stored beforehand on the disk to store the key in a predetermined memory. Next, the server certification unit 23 requests the server to transmit the certificate. On receiving the request, the server encrypts the certificate by means of a secret key owned by the server, and transmits it to the content reproduction apparatus. On receiving the certificate, the server certification unit 23 decrypts the certificate by means of the public key, and collates the server name included in the decrypted certificate with the accessed server name. When both of them agree with each other, and the server certification is successful, it is determined that the server 101 is a valid server corresponding to the domain name stored in the specific area of the disk inserted in the reproduction apparatus 100, and the server certification flag "1" is stored. When the accessed server name does not agree with the server name included in the decrypted certificate, it is determined that the server certification has failed, and the server certification flag "0" is stored.

For example, when the domain name (identifier) of the server is included in the contents of the server certificate, it can be confirmed that the valid server is accessed.

In a case where the above-described server certification has failed, even when the request for the access to the network is occurred while the reproduction apparatus is reproducing the content on the disk, the network is not accessed.

When the above-described server certification is successful, it is determined that the server is the valid server corresponding to the domain name recorded in the specific area of the disk, and the server accessible from the reproduction apparatus can be limited to the server corresponding to the domain name stored in the destination management table.

When the server certification becomes successful, next the disk certification is performed.

(1-2) Disk Certification

In the disk certification, it is checked whether or not the content data recorded on the disk inserted in the reproduction apparatus is valid. When the disk certification is performed, it is possible to avoid the access to valid server by executing the illegal program in a case where the tampered content data (especially the tampered illegal program) is recorded on the disk.

The disk certification processing will be described hereinafter with reference to a flowchart of FIG. 4.

When the server certification shown in FIG. 2 becomes successful, the disk certification unit 24 determines whether or not the domain name is stored in the destination management table, and whether or not the server certification is successful (step S21). In a case where the domain name is not stored in the destination management table, or when the server certification flag indicates "0" (step S21), the subsequent disk certification processing is not performed. Therefore, it is not possible to access the network (step S22).

When the domain name is stored in the destination management table, and the server certification flag indicates "1" (step S21), the request for the disk certification is transmitted to the server corresponding to the domain name stored in the destination management table via the communication unit 4 (step S23).

The server which has received the disk certification request selects at random a recording area of the disk on which data capable of identifying the disk is recorded (step S24). Here, not only one but also a plurality of recording areas may be selected. Moreover, the reproduction apparatus is requested to transmit a hash value of the data recorded in the selected recording area (step S25). In this case, the value may be requested to be encrypted by use of a predetermined algorithm before transmitted.

When the reproduction apparatus 100 receives this transmission request, the disk certification unit 24 reads the data of the recording area designated by the server from the disk via the disk controller 1 (step S26), and calculates the hash value of the read data (step S27).

When the server requests the hash value to be encrypted before transmitted, this hash value is encrypted using a predetermined algorithm. The obtained hash value is transmitted to the server (step S28).

The server is provided with a valid disk on which the content data corresponding to the server is recorded. The server which has received the hash value reads the data from the recording area of the disk selected in the step S24 to calculate the hash value. Moreover, this calculated hash value is compared with the hash value received from the reproduction apparatus (step S29). When both of them disagree (disk certification fails), it is determined that the content data recorded on the disk presently inserted in the reproduction apparatus might be tampered. In this case, the server transmits an access non-permission notice to the reproduction apparatus 100 (step S31).

When the hash value calculated by the server agrees with the hash value received from the reproduction apparatus (disk certification is successful), it is determined that the content data recorded on the disk presently inserted in the content reproduction apparatus is not tampered. In this case, the server transmits an access permission notice to the content reproduction apparatus 100 (step S33).

When the content reproduction apparatus 100 receives the access permission notice/access non-permission notice from the server, the disk certification unit 24 records the value of the disk certification flag indicating whether or not the disk certification is successful in the destination management table stored in the destination management unit 21 and shown in FIG. 18 based on the contents of the received notice. When the access permission notice is received, and the disk certification is successful, the value of the disk certification flag is set to "1" (step S34). When the access non-permission notice is received, and the disk certification fails, the value of the disk certification flag is set to "0" (step S32).

In the disk certification processing, the server selects at random the recording area in which the data capable of identifying the disk is recorded with respect to the disk on which the content data corresponding to the server is recorded, and it is determined whether or not the data in the recording area is tampered by use of the hash value of the data of the selected recording area, the hash value being transmitted from the reproduction apparatus.

There will be described another disk certification processing using data (program) in the recording area of the disk on which the program having a possibility of harming another program if tampered is recorded instead of performing the disk certification by use of the data in an arbitrary recording area of the disk, with reference to a flowchart shown in FIG. 5. It is to be noted that in FIG. 5, the same parts as those of FIG. 4 are denoted with the same reference numerals, and an only different part will be described.

Figure 4:
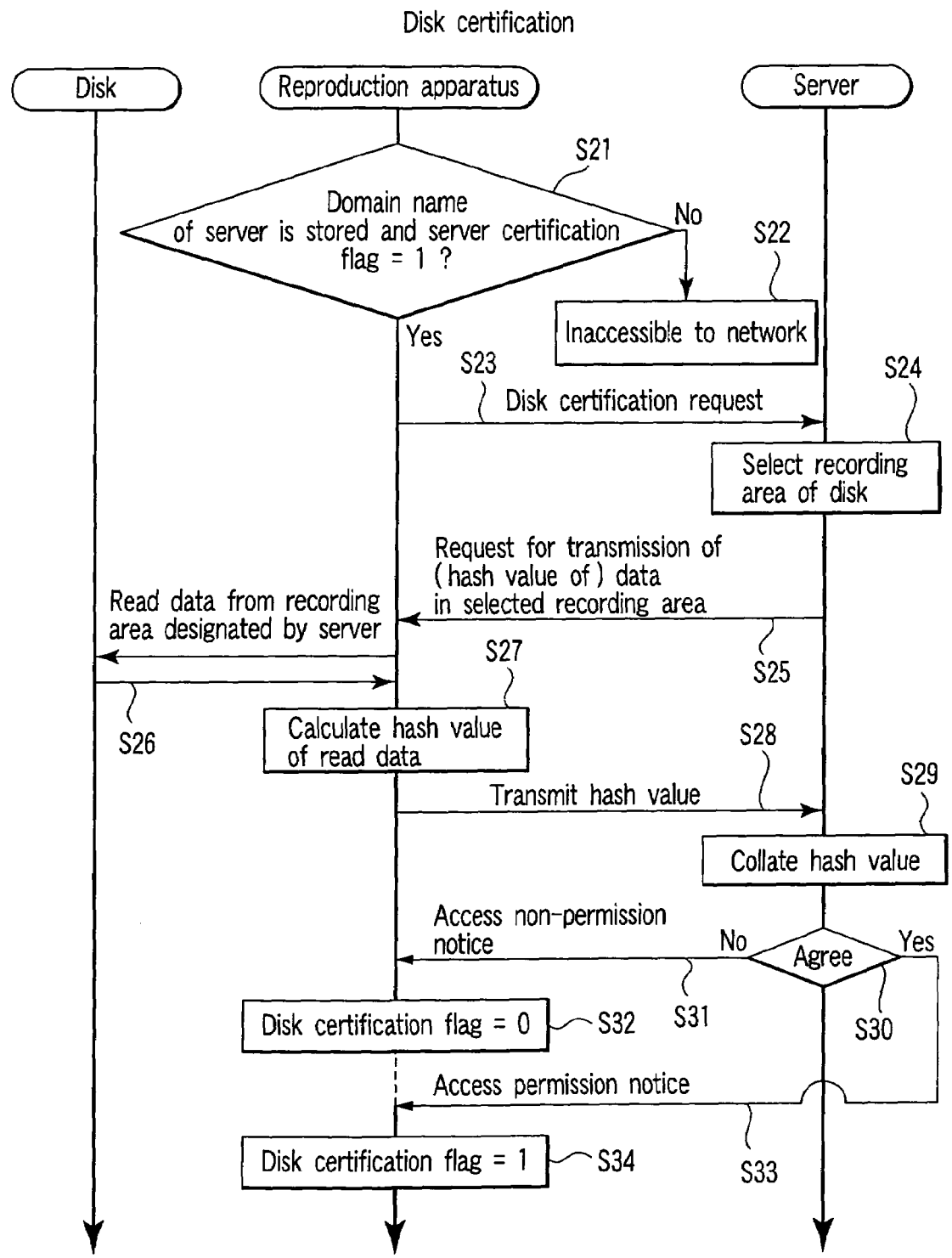
FIG. 4 is a flowchart showing a disk certification processing operation.
Figure 5:
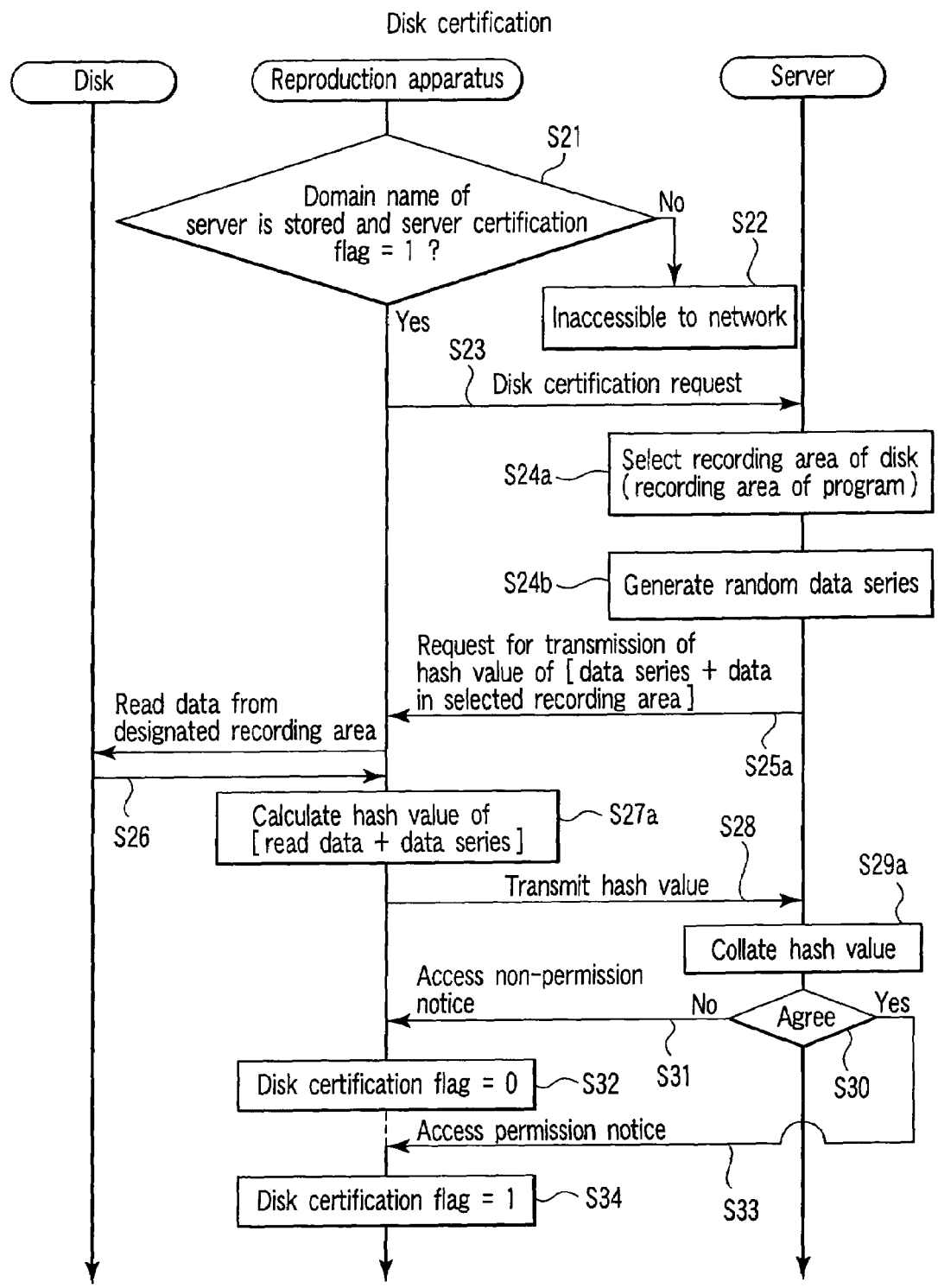
FIG. 5 is a flowchart showing another disk certification processing operation.

That is, the step S24 of FIG. 4 is replaced with steps S24a and S24b in FIG. 5, the step S25 of FIG. 4 is replaced with step S25a in FIG. 5, the step S27 of FIG. 4 is replaced with step S27a in FIG. 5, and the step S29 of FIG. 4 is replaced with step S29a in FIG. 5.

On receiving the disk certification request, in the step S24a of FIG. 5, the server selects the recording area of the disk on which the program having the possibility of harming the other program if tampered is recorded. In this case, as to the disk on which the content data corresponding to the server is recorded, the server stores beforehand the recording area in which the program (program having the possibility of harming the other program if tampered) is recorded. Moreover, at least one of the recording areas in which the programs are recorded is selected. A plurality of recording areas may be selected.

Next, in the step S24b, the server generates a random data series. Moreover, in the step S25a, the content reproduction apparatus 100 is requested to transmit the hash value calculated from the generated data series and the data (program data) recorded in the recording area selected in the step S24a. In this case, the value may be requested to be encrypted using the predetermined algorithm before transmitted.

When the reproduction apparatus 100 receives this transmission request, the disk certification unit 24 reads, from the disk, the data of the recording area designated by the server via the disk controller 1 (step S26). In the step S27a, the read data is combined with the data series sent from the server to calculate the hash value of the whole data including the read data and the data series sent from the server. When the server requests the hash value to be encrypted before transmitted, this hash value is encrypted using a predetermined algorithm. The obtained hash value is sent to the server (step S28).

The server is provided with the valid disk on which the content data corresponding to the server is recorded. In the step S29a, the server which has received the hash value reads the data from the recording area of the disk selected in the step S24a, and combines the read data with the data series generated in the step S24b to calculate the hash value from the whole data including the read data and the data series generated in the step S24b. Moreover, this calculated hash value is compared with the hash value received from the reproduction apparatus (step S29a). Thereafter, in the same manner as in FIG. 4, when both of them disagree (disk certification fails), the server transmits the access non-permission notice to the content reproduction apparatus 100 (step S31), and the content reproduction apparatus sets the disk certification flag to "0" (step S32). When the hash value calculated by the server agrees with the hash value received from the reproduction apparatus (disk certification is successful), the server transmits the access permission notice to the content reproduction apparatus 100 (step S33), and the content reproduction apparatus sets the disk certification flag to "1" (step S34).

The disk certification is valid until the disk is taken out of the reproduction apparatus. That is, when the disk is removed from the reproduction apparatus, the disk certification flag is rewritten to "0".

In the above-described description, it is determined by the disk certification flag whether or not the disk is valid. As another system, there will be described hereinafter a system in which a valid period (period for which the validity of the disk is assured) designated by the server and a session identifier are used. This can be realized using Cookie in a case where, for example, a hyper text transfer protocol (HTTP) is used as a communication protocol.

In step S33 of FIG. 4 or 5, the server transmits to the disk certification unit 24 the valid period (designated as, e.g., "300 seconds") and the session identifier (e.g., random character string generated by the server to identify the reproduction apparatus) together with the access permission notice. The disk certification unit 24 stores the valid period and the session identifier sent from the server in the destination management table stored in the destination management unit 24. Subsequently, in a case where the apparatus communicates with the server in step S54 shown in FIG. 8, when the session identifier is added to communication data to the server, the server can determine that the disk certification is being performed. Even when the communication data to which any session identifier is not added is sent from the reproduction apparatus, the server rejects the data.

The disk certification unit 24 sets a value of the stored valid period to "0", and deletes the session identifier in a case where the stored valid period elapses or in accordance with an operation of the reproduction apparatus (e.g., in a case where a user removes the disk or the content being reproduced is stopped). In this case, the disk certification flag may be updated from "1" to "0".

After the stored valid period elapses or the valid period turns to "0" by means of the predetermined user operation, the above-described disk certification is performed again, when the valid period turns to "0" or the request for the access to the network is occurred during the reproduction or the execution of the content data.

Figure 8:
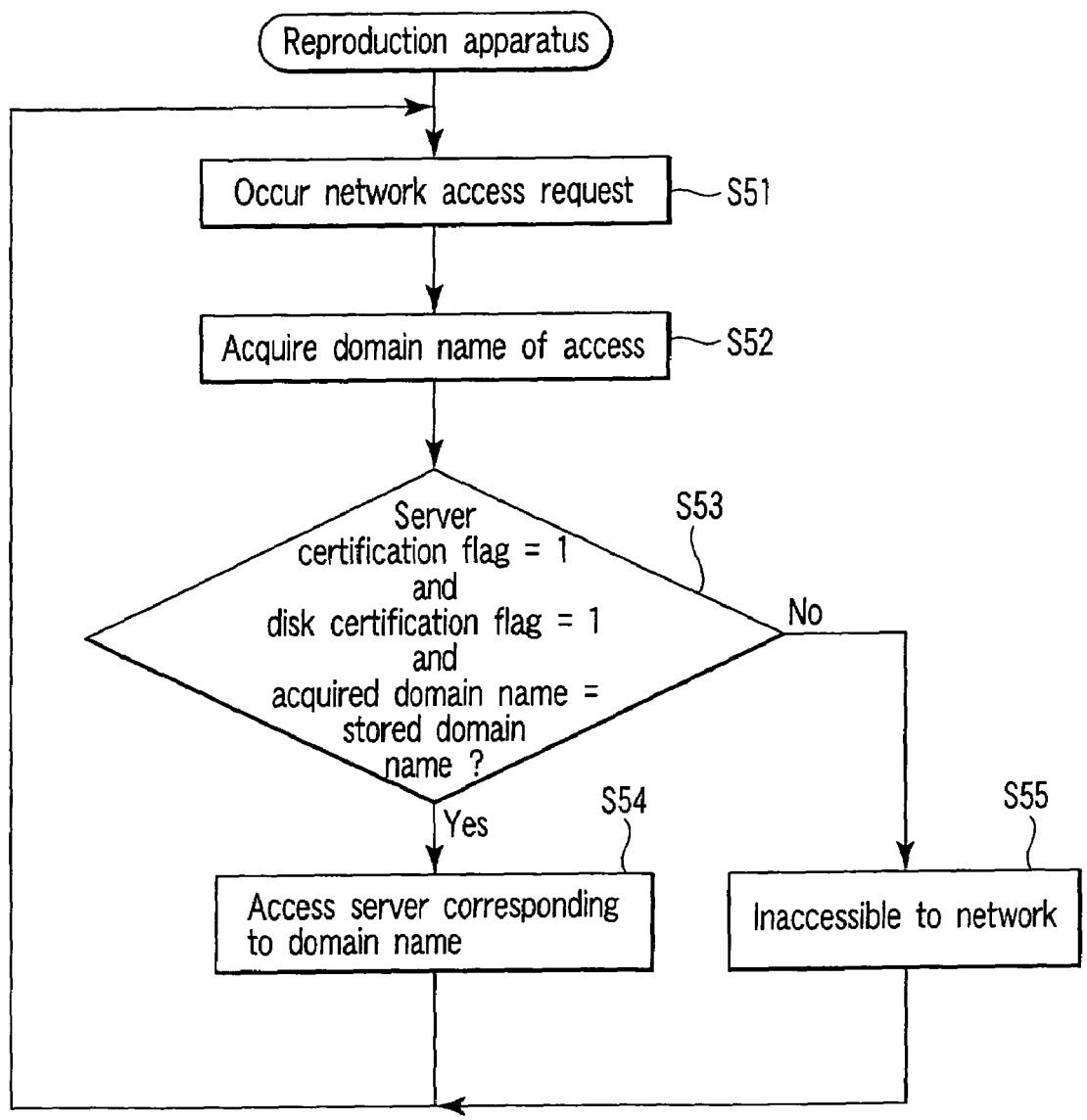
FIG. 8 is a flowchart showing a processing operation of the content reproduction apparatus at a time when the network access request is occurred during disk reproduction.

Moreover, in a case where the stored session identifier is deleted, since it is not possible to communicate with the server in the step S54 of FIG. 8, the disk certification is performed again.

In a case where the valid period is used in this manner, there is added a condition that the valid period is not "0" in step S53 of FIG. 8 in order to access the server on receiving the access request occurred during the reproduction or the execution of the content data. In a case where the session identifier is used, there is added a condition that the session identifier is stored in step S53 of FIG. 8.

It is to be noted that in the present embodiment, it has been described that one server performs the disk certification processing corresponding to a certain content, but one server may perform a plurality of disk certification processing. In this case, for example, when an identifier to uniquely specify the disk or content is stored beforehand on the disk, and the identifier is read from the disk to transmit the identifier to the server during the disk certification, the server can specify the disk.

(2) There will be described a case where the server certification and the disk certification are performed at a time when a request for an access to the server (network) is occurred after the disk is inserted into the reproduction apparatus, with reference to a flowchart shown in FIG. 6. It is to be noted that in FIG. 6, the same parts as those of FIG. 2 are denoted with the same reference numerals, and an only different part will be described. That is, the step S2 of FIG. 2 is replaced with step S12 in FIG. 6.

In the server certification shown in FIG. 2, when the disk is inserted into the reproduction apparatus in the step S2, the disk readout unit 12 reads the domain name of the destination from the predetermined specific area of the disk (step S3).

Figure 6:
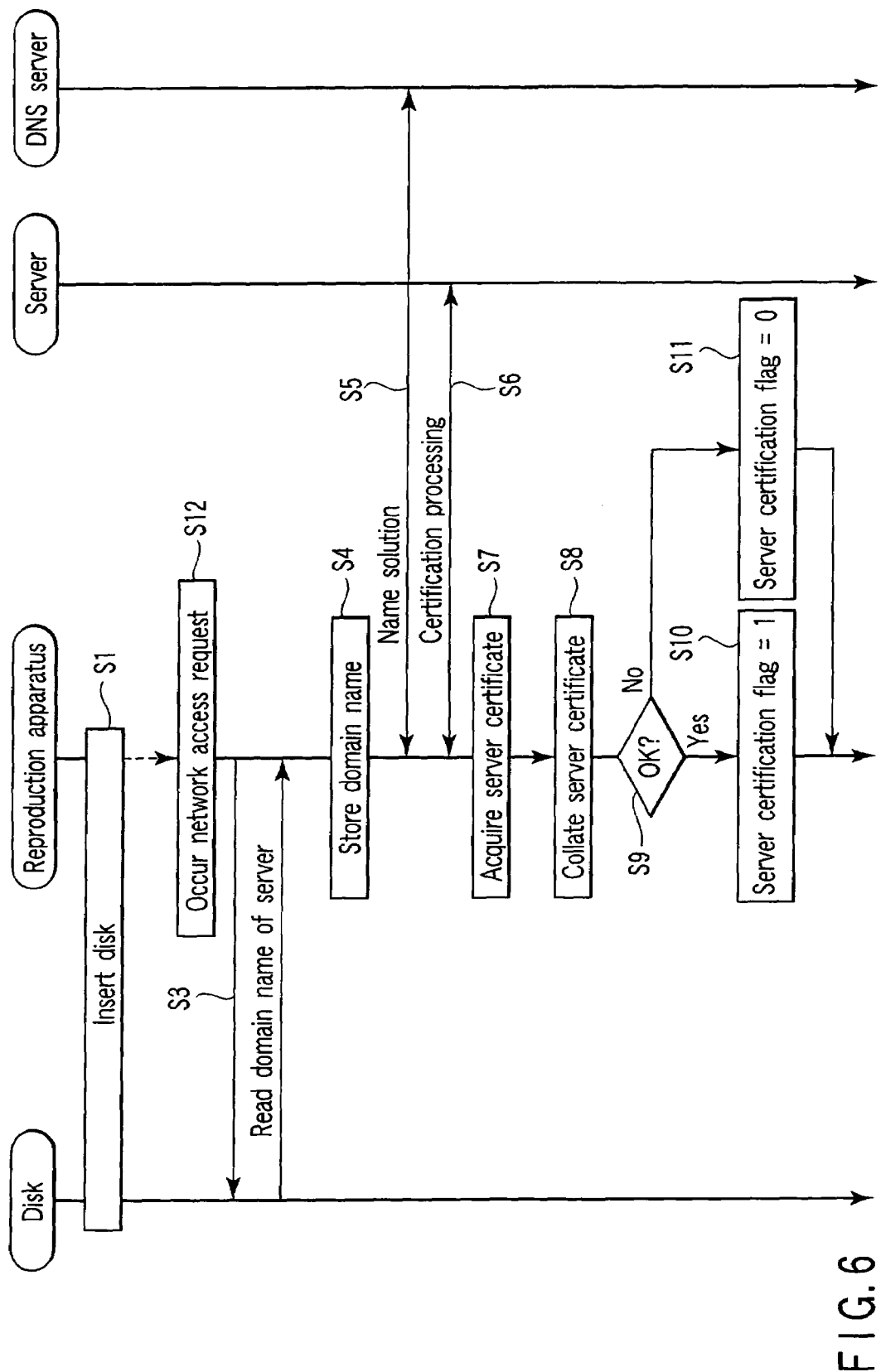
FIG. 6 is a flowchart showing another server certification processing operation (server certification performed at a time when a network access request is occurred)

On the other hand, in the server certification shown in FIG. 6, after the disk is inserted into the reproduction apparatus, for example, when the program recorded on the disk is executed, and accordingly the request for the access to the server (network) is (first) occurred in step S12, the disk readout unit 12 reads the domain name of the destination from the predetermined specific area of the disk (step S3). The subsequent processing operation is similar to that of the steps S4 to S11 of FIG. 2.

After the server certification processing of FIG. 6 is performed, the disk certification is performed as shown in FIG. 4 or 5.

(3) There will be described another example of the case where the server certification and the disk certification are performed at the time when the request for the access to the server (network) is occurred after the disk is inserted into the reproduction apparatus, with reference to a flowchart shown in FIG. 7. It is to be noted that in FIG. 7, the same parts as those of FIGS. 2 and 6 are denoted with the same reference numerals, and an only different part will be described. That is, in FIG. 7, in the same manner as in FIG. 2, when it is detected that the disk is inserted into the reproduction apparatus (step S2), the disk readout unit 12 reads the domain name of the destination from the predetermined specific area of the disk (step S3). Moreover, the read domain name is recorded in the destination management table stored in the memory of the destination management unit 21 and shown in FIG. 18 (step S4). The steps up to now are similar to those of FIG. 2.

Figure 7:
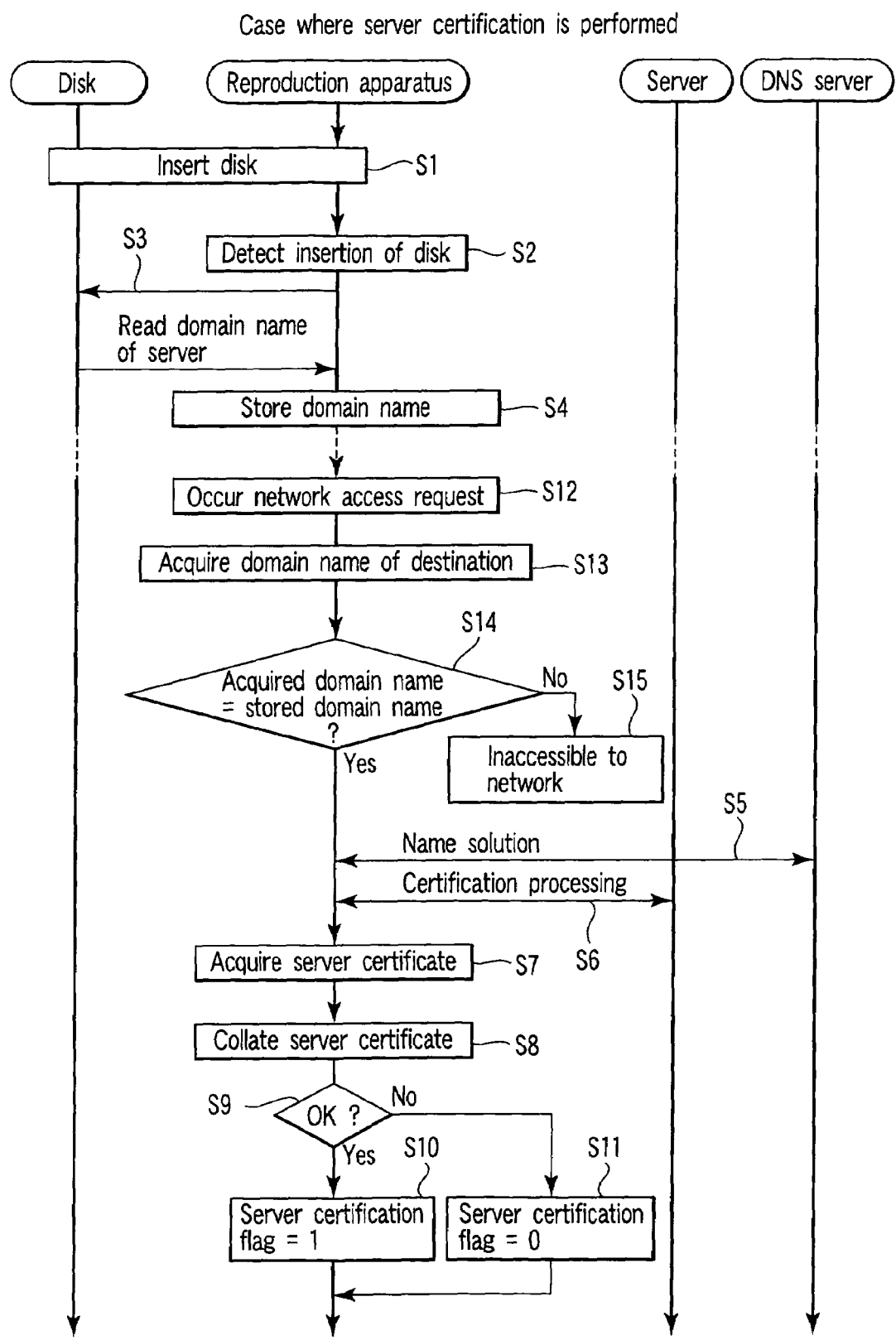
FIG. 7 is a flowchart showing still another server certification processing operation (server certification performed at a time when the network access request is occurred)

FIG. 7 is different from FIG. 2 in that processing of steps S5 to S11 by the server certification unit 23 is performed after performing processing of steps S12 to S14 in FIG. 7. That is, in the disk detection unit 11, it is detected that the disk is inserted into the reproduction apparatus, and the domain name read from the specific area of the disk is recorded in the destination management table (steps S1 to S4 of FIG. 7). Thereafter, when the program recorded on the disk inserted in the reproduction apparatus is executed, and accordingly the request for the access to the server (network) is (first) occurred, that is, when the access request is output from the reproduction/execution controller 3 (step S12 of FIG. 7), the access request is detected by the destination verification unit 22 of the network access controller 2. The destination verification unit 22 acquires the domain name of the destination designated by the corresponding program (step S13).

The domain name of the destination included in the program is included in the access request occurred in the reproduction/execution controller 3 by executing the program recorded on the disk. The destination verification unit 22 acquires the domain name of the destination included in the access request.

Next, the destination verification unit 22 compares the acquired domain name with the domain name recorded in the destination management table (step S14). When both of them agree with each other, the server certification unit starts certification processing (steps S5 to S11) of the server corresponding to the domain name recorded in the access management table.

When the acquired domain name is different from the domain name recorded in the destination management table, here the processing is stopped, and the server certification processing (steps S5 to S11) in the server certification unit 23 is not performed. As a result, the reproduction apparatus 100 does not access the network.

When the acquired domain name agrees with the domain name recorded in the destination management table, the server certification unit 23 starts the certification processing (steps S5 to S11) of the server corresponding to the domain name recorded in the access management table in the same manner as in FIG. 2. That is, the server certification unit 23 acquires a certificate from the server corresponding to the domain name recorded in the access management table (steps S5 to S7). When the acquired certificate agrees with the certificate stored beforehand in the server certification unit 23, and the server certification is successful, the server certification flag "1" is stored in the access management table (steps S8 to S10). When the acquired certificate is different from the certificate stored beforehand in the server certification unit 23, the server certification flag "0" is stored in the access management table (steps S8, S9, and S11).

The disk certification is performed as shown in FIG. 4 or 5 after performing the server certification processing of FIG. 7.

In the present embodiment, the system has been described in which the disk certification processing is performed (1) when the disk is inserted into the content reproduction apparatus or (2) when the request for the access to the server (network) is occurred. In these cases, when disk replacement cannot be detected owing to a defect of the reproduction apparatus or the like, there is a danger that the disk is replaced with another disk after the disk certification processing.

In this case, since the domain name of the destination management table, the server certification flag, and the disk certification flag are not deleted, the program stored in the replacing disk can access the server having the domain name stored in the destination management table.

To avoid the danger, after completion of the disk certification processing, the disk certification unit 24 of the network access controller may repeatedly execute the disk certification processing at a certain timing (e.g., periodically or irregularly based on a random number).

<Access Control for Limiting Server to be Accessed>

As shown in FIGS. 2 and 7, when the disk is inserted into the reproduction apparatus 100, the apparatus reads the domain name recorded in the specific area of the disk to record the name in the destination management table. In FIG. 2, the server certification and the disk certification are further performed, and "1" or "0" is recorded as the server certification flag and the disk certification flag.

Next, there will be described a case where the network access request is occurred during the reproduction apparatus 100 reproduces the content data of the inserted disk with reference to a flowchart shown in FIG. 8.

After the disk is inserted into the reproduction apparatus, the network access request, is occurred (a) when the program recorded in the corresponding disk is executed or (b) when the data or the program downloaded from the network (server) already stored in the memory unit 6 is reproduced or executed, for example, while executing the program recorded on the disk as described later.

The network access request is detected by the destination verification unit 22 of the network access controller 2 in the same manner as described above (step S51). The destination verification unit 22 acquires the domain name of the destination designated by a program (program recorded on the disk or program stored in the memory unit 6) which has occurred the network access request (step S52).

In the case that the server certification shown in FIG. 7 is performed, when the network access request is first detected (step S12 of FIG. 7) and the domain name of the destination is acquired (step S13 of FIG. 7) in the steps S51 and S52 after inserting the disk, the server certification is started, the disk certification is further performed, and "1" or "0" is recorded as the server certification flag and the disk certification flag.

Moreover, in the case that the server certification processing shown in FIG. 6 is performed, in the steps S51 and S52 after inserting the disk, when the network access request is first detected (step S12 of FIG. 6, the domain name recorded in the specific area of the disk is read, and recorded in the destination management table (steps S3 and S4 of FIG. 6). Thereafter, the server certification and the disk certification are performed to record "1" or "0" as the server certification flag and the disk certification flag.

Therefore, in a case where the network access request is detected, and the domain name of the destination is acquired in the steps S51 and S52 of FIG. 8, in any of FIGS. 2, 7, and 8, the domain name is recorded in the destination management table, and "1" or "0" is recorded as the server certification flag and the disk certification flag which indicate results of the server certification and the disk certification.

Only in a case where all of three conditions are satisfied: (first condition) the server certification flag be "1"; (second condition) the disk certification flag be "1"; and (third condition) the domain name acquired from a network access requester in the step S52 should agree with (be equal to) the domain name (domain name read from the specific area of the disk) recorded in the destination management table, the destination verification unit 22 permits the access to the server corresponding to the domain name recorded in the destination management table (step S53). In a case where at least any one of the first to third conditions is not satisfied, the access to the network is not permitted (steps S53, S55).

In a case where the access to the network is permitted in the destination verification unit 22, the communication unit 4 accesses the server corresponding to the domain name recorded in the access management table to receive, from the server, the data, the program or the like for use in reproducing and executing the content data of the disk (step S54). As a result, the reproduction/execution controller 3 of the reproduction apparatus 100 reproduces or executes the content data on the disk using the data or the program downloaded from the server.

As described above, in the reproduction apparatus, the server certification, the disk certification, and the access control shown in FIG. 7 are performed to limit the server of the destination at the time of the detection of the network access request to the server corresponding to the domain name recorded in the specific area of the disk inserted into the reproduction apparatus. Accordingly, the reproduction apparatus is prevented from becoming a steppingstone for DDoS attack or the like.

It is to be noted that in the present embodiment, it has been described that there is one-to-one correspondence between the disk and the server, and one domain name of the server is assumed to be stored in the specific area of the disk. However, in a case where a domain name list including a plurality of server domain names is stored in the specific area of the disk, the disk readout unit 12 reads the domain name list from the specific area to store the list in the destination management table of the destination management unit 21 in the same manner as in a case where one domain name is stored in the above-described specific area. In this case, the identifier of each server described in the domain name list is subjected to the above-described server certification processing, disk certification processing, and access control processing.

For example, when the disk is inserted or the request for the access to the network is detected, the disk readout unit 12 reads the domain name list from the specific area of the disk to store the list in the destination management table (step S4).

The server certification (steps S5 to S11) may be performed with respect to each domain name of the domain name list immediately after the list is read out.

When the program is executed during the content reproduction, the request for the access to the network is detected, and the domain name of the destination included in the program is included in the domain name list, the server corresponding to the domain name may be subjected to the above-described server certification.

When the program is executed during the content reproduction, the request for the access to the network is detected, the domain name of the destination included in the program is included in the domain name list, and the server certification flag of the server corresponding to the domain name is "1", the disk certification is requested with respect to the server corresponding to the domain name, and the disk certification is performed (steps S23 to S34).

<Storage Control by Storage Controller and Server>

In the reproduction apparatus of the present embodiment, the data read from the disk, the video/audio data or the program downloaded from the server and the like are stored in the memory unit 6, and utilized when required next time. Since the data stored in the memory unit 6 can be accessed by anyone, there might be generated problems such as an operation defect of the reproduction apparatus 100 or the like owing to the execution of the tampered program and leakage of stored personal information or the like. To prevent these problems, the storage controller 5 keeps secret the data to be stored when storing the data in the memory unit 6, detects whether or not the data is tampered when using the data stored in the memory unit 6, and prevents the tampered data from being utilized in the content reproduction apparatus 100. Such control performed in the storage controller 5 is referred to as a storage control herein.

There will be described a case where a data write request is occurred and detected when the content on the disk is reproduced by the reproduction apparatus 100, with reference to a flowchart shown in FIG. 9. The data write request is occurred: (a) by executing the program recorded on the disk; (b) by reproducing or executing the data or the program downloaded from the network (server) already stored in the memory unit 6, for example, when the program recorded on the disk is executed; or (c) in accordance with an instruction from a user.

Moreover, the data stored in the memory unit 6 in response to the data write request is data (including the program) on the disk being reproduced, data (including the program) downloaded from the server connected as shown in FIG. 8 or the like.

Figure 9:
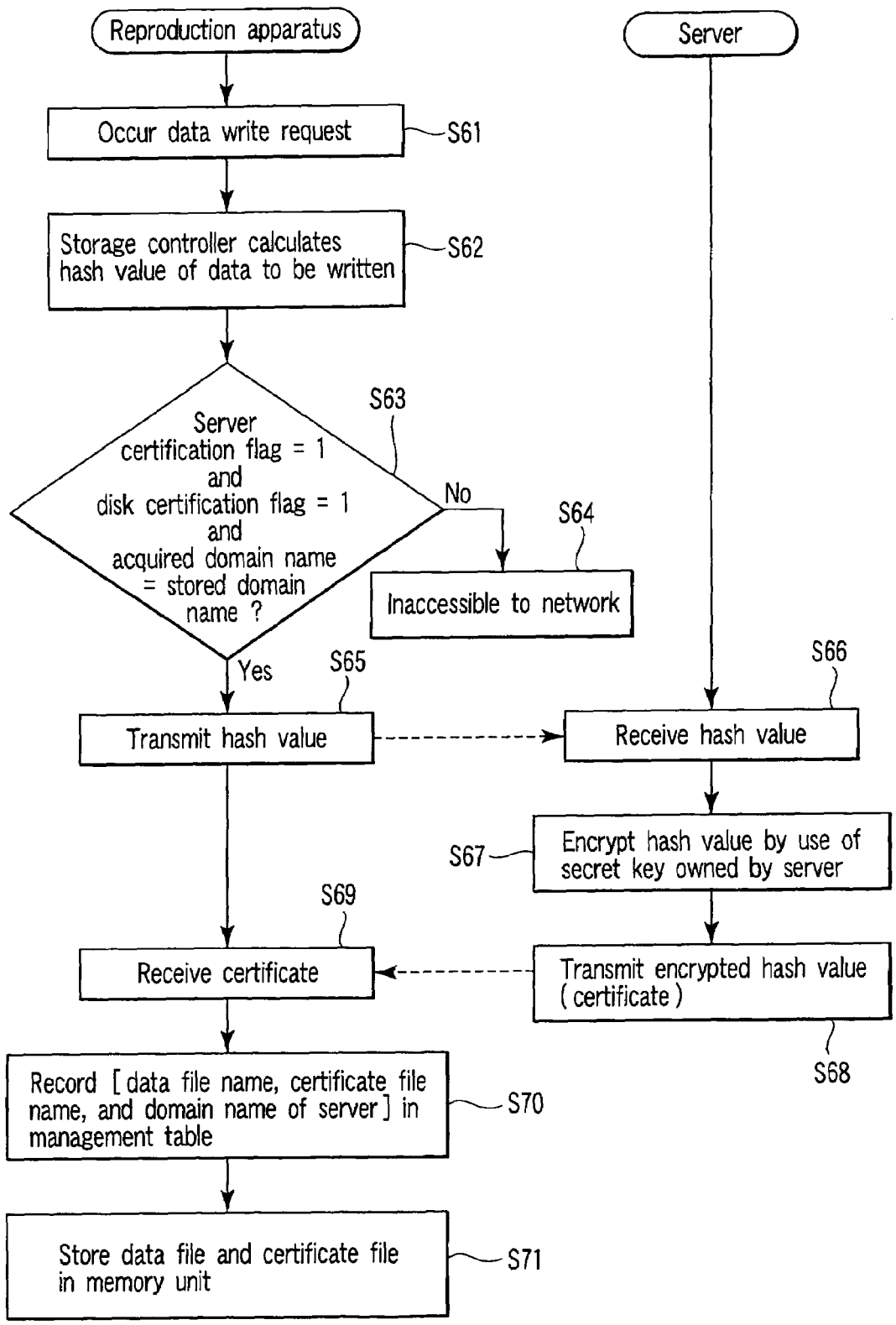
FIG. 9 is a flowchart showing storage control processing (processing operations of the content reproduction apparatus and a server at a time when a data write request is occurred) performed by a storage controller and the server.

In FIG. 9, when the data write request is occurred (step S61), and the storage controller 5 detects the data write request, the storage controller 5 calculates the hash value of the data to be written into the memory unit 6 (step S62). The hash value is calculated by use of, for example, MD5, SHA-1 or the like.

Next, to transmit the resultant hash value to the server (server corresponding to the domain name registered in the destination management table), the destination verification unit 22 checks whether or not two conditions are all satisfied: (first condition) the server certification flag be "1"; and (second condition) the disk certification flag be "1". Especially when the data write request is occurred by executing the program, and the destination is designated by the program, the access to the server corresponding to the domain name recorded in the access management table is permitted only in a case where three conditions including a third condition in addition to the first and second conditions are all satisfied: (third condition) the destination (e.g., domain name) designated by the program of a data write requester is acquired, and the acquired domain name agrees with the domain name (domain name read from the specific area of the disk) recorded in the access management table (step S63). When at least any one of the conditions is not satisfied, the network is not accessed. Therefore, any data is not written into the memory unit 6 (step S64).

In a case where the destination verification unit 22 permits the access to the network, the processing advances to step S65. The communication unit 4 connects the reproduction apparatus 100 to the server corresponding to the domain name registered in the destination management table, and the storage controller 5 transmits the hash value of the data to be written to the server via the communication unit 4.

On receiving the hash value (step S66), the server encrypts the received hash value by use of a secret key stored beforehand in the server (step S67), and returns the encrypted hash value as a certificate to the reproduction apparatus 100 (step S68).

In the reproduction apparatus 100, on receiving the certificate transmitted from the server (step S69), the storage controller 5 records a file name (data file name) of the data to be written, a file name (certificate file name) of the received certificate data, and an identifier (e.g., the domain name of the server herein) of the server which has performed encryption (in this case, the server corresponding to the domain name registered in the destination management table) as one set of records in the management table disposed in the memory unit 6 (step S70). Furthermore, the data (data file) to be written in the memory unit 6, and the received certificate (certificate file) are stored in the memory unit 6 (step S71).

Next, there will be described a case where a data readout request with respect to the data stored in the memory unit 6 is occurred as shown in FIG. 9, when the content on the disk is reproduced by the reproduction apparatus 100, with reference to a flowchart shown in FIG. 10. The data readout request is occurred: (a) by executing the program recorded on the disk; (b) by reproducing or executing the data or the program downloaded from the network (server) already stored in the memory unit 6, for example, when the program recorded on the disk is executed; or (c) in accordance with the instruction from the user.

Figure 10:
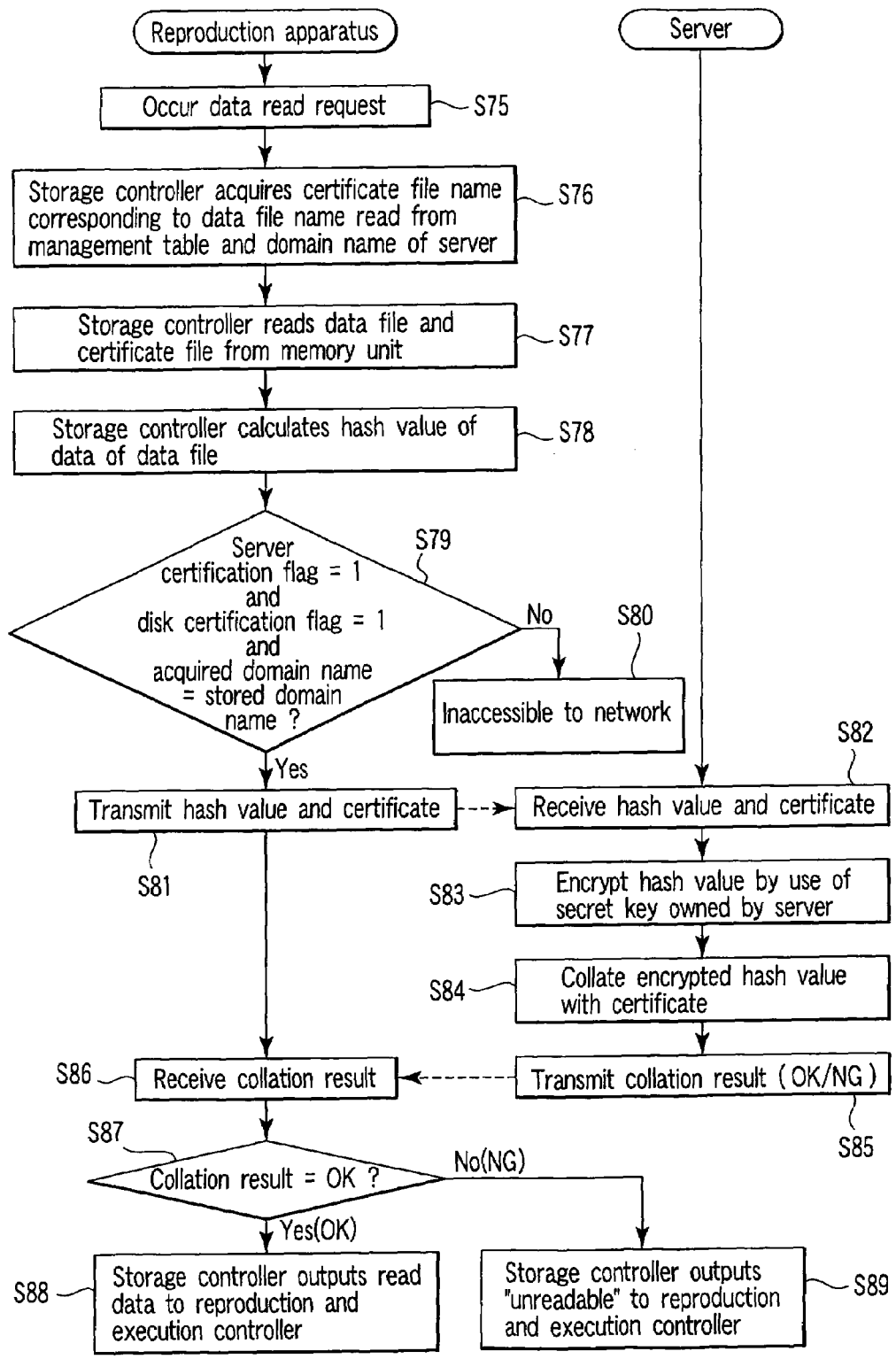
FIG. 10 is a flowchart showing storage control processing (processing operations of the content reproduction apparatus and the server at a time when a data read request is occurred) performed by the storage controller and the server.

In FIG. 10, when the data readout request is occurred (step S75), and the storage controller 5 detects the data readout request, the storage controller 5 acquires the certificate file corresponding to the data file name to be read and the domain name of the server with reference to the management table (step S76). Furthermore, the storage controller reads, from the memory unit 6, the data file having the data file name, and the certificate file corresponding to the certificate file name (step S77). Moreover, the storage controller 5 calculates the hash value of the data in the read data file (step S78).

Next, in order to transmit the resultant hash value and the certificate data in the certificate file to the server (server corresponding to the domain name registered in the destination management table), the destination verification unit 22 permits the access to the server corresponding to the domain name recorded in the access management table only in a case where all of three conditions are satisfied: (first condition) the server certification flag be "1"; (second condition) the disk certification flag be "1"; and (third condition) the domain name acquired in the step S76 should agree with the domain name (domain name read from the specific area of the disk) recorded in the access management table (step S79). When at least any one of the conditions is not satisfied, the network is not accessed. Therefore, any data is not read from the memory unit 6 (step S80).

In a case where the destination verification unit 22 permits the access to the network, the processing advances to step S81. The communication unit 4 connects the reproduction apparatus 100 to the server corresponding to the domain name registered in the destination table, and the storage controller 5 transmits the hash value of the read data and the certificate to the server via the communication unit 4 (step S81).

On receiving the hash value and the certificate (step S82), the server encrypts the received hash value by use of the secret key stored beforehand in the server in the same encryption system as that in encrypting the received hash value in the step S67 of FIG. 9 (step S83), and collates the encrypted hash value with the certificate transmitted from the reproduction apparatus (step S84). When the encrypted hash value agrees with the received certificate, "OK" is transmitted as a collation result to the reproduction apparatus. When they differ from each other, "NG" is transmitted as the collation result to the reproduction apparatus (step S85).

In the reproduction apparatus 100, on receiving the collation result (step S86), the storage controller 5 outputs the data in the data file read from the memory unit 6 to the reproduction and execution controller (reproduction/execution controller) 3 (step S88) in a case where the collation result is "OK" (step S87). In a case where the collation result is "NG" (step S87), the storage controller 5 discards the data instead of outputting the data in the data file read from the memory unit 6 to the reproduction/execution controller 3, and outputs a message indicating "unreadable" to the reproduction/execution controller 3 (step S89).

In a case where the encrypted hash value is different from the received certificate in the step S84, that is, the certification by the above-described storage control fails, there is a possibility that the data in the data file read from the memory unit 6 in the step S77 is tampered. The storage controller 5 does not access the data stored in the memory unit 6, which might be tampered (step S89), so that security of the reproduction apparatus 100 can be enhanced.

The storage control shown in FIGS. 9 and 10 indicates a case where the certification is performed using the certificate of the data, when the data stored in the memory unit 6 is read.

Next, there will be described the storage control in a case where the data stored in the memory unit 6 is kept secret (to be prevented from being tampered), with reference to flowcharts shown in FIGS. 11 and 12.

First, there will be described a case where the data write request is occurred when the content on the disk is reproduced by the content reproduction apparatus 100, with reference to a flowchart shown in FIG. 11.

Figure 11:
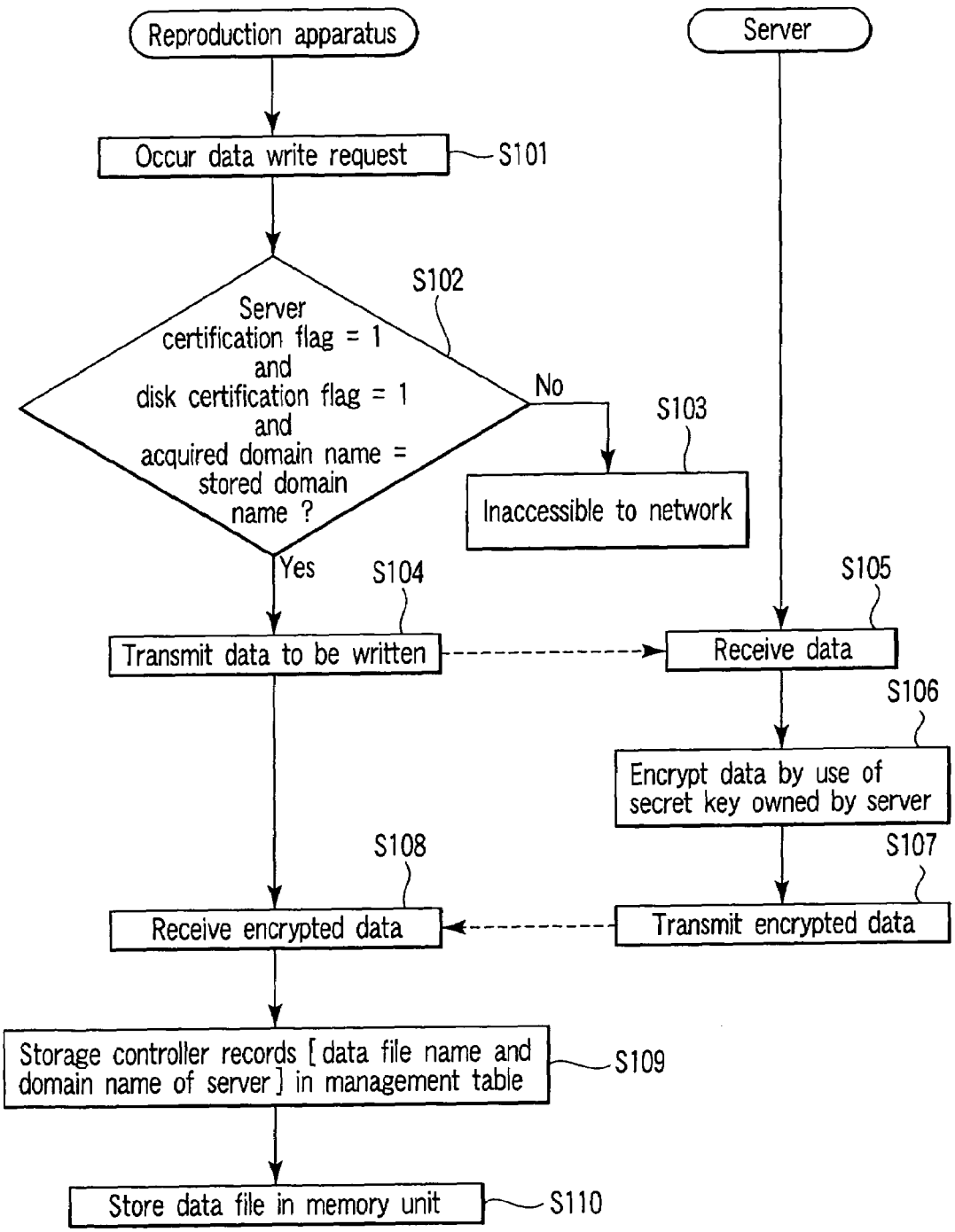
FIG. 11 is a flowchart showing another storage control processing (processing operations of the content reproduction apparatus and the server at the time when the data write request is occurred) performed by the storage controller and the server.

In FIG. 11, when the data write request is occurred and detected by the storage controller 5 (step S101), the destination verification unit 22 checks whether or not two conditions are all satisfied: (first condition) the server certification flag be "1"; and (second condition) the disk certification flag be "1". Especially when the data write request is occurred by executing the program, and the destination is designated by the program, the access to the server corresponding to the domain name recorded in the access management table is permitted only in a case where three conditions including a third condition in addition to the first and second conditions are all satisfied: (third condition) the destination (e.g., domain name) designated by the program of the data write requester is acquired, and the acquired domain name agrees with the domain name (domain name read from the specific area of the disk) recorded in the access management table (step S102). When at lest any one of the conditions is not satisfied, the network is not accessed. Therefore, any data is not written into the memory unit 6 (step S103).

In a case where the destination verification unit 22 permits the access to the network, the processing advances to step S104. The communication unit 4 connects the content reproduction apparatus 100 to the server corresponding to the domain name registered in the destination table, and the storage controller 5 transmits the data to be written to the server via the communication unit 4 (step S104).

On receiving the data (step S105), the server encrypts the received data by use of a secret key stored beforehand in the server (step S106), and returns the encrypted data to the reproduction apparatus 100 (step S107).

In the reproduction apparatus 100, on receiving the encrypted data transmitted from the server (step S108), the storage controller 5 records a file name (data file name) of the encrypted data and an identifier (e.g., the domain name of the server herein) of the server which has performed encryption (in this case, the server corresponding to the domain name registered in the destination management table) as one set of records in the management table disposed in the memory of the storage controller 5 (step S109). Furthermore, the data (data file) encrypted by the memory unit 6 is stored in the memory unit 6 (step S110). The data kept secret as described above is stored in the memory unit 6.

Next, there will be described a case where a data readout request with respect to the secret data stored in the memory unit 6 as shown in FIG. 11 is occurred, when the content on the disk is reproduced by the content reproduction apparatus 100, with reference to a flowchart shown in FIG. 12. The data readout request is occurred: (a) by executing the program recorded on the disk; (b) by reproducing or executing the data or the program downloaded from the network (server) already stored in the memory unit 6, for example, when the program recorded on the disk is executed; or (c) in accordance with the instruction from the user.

Figure 12:
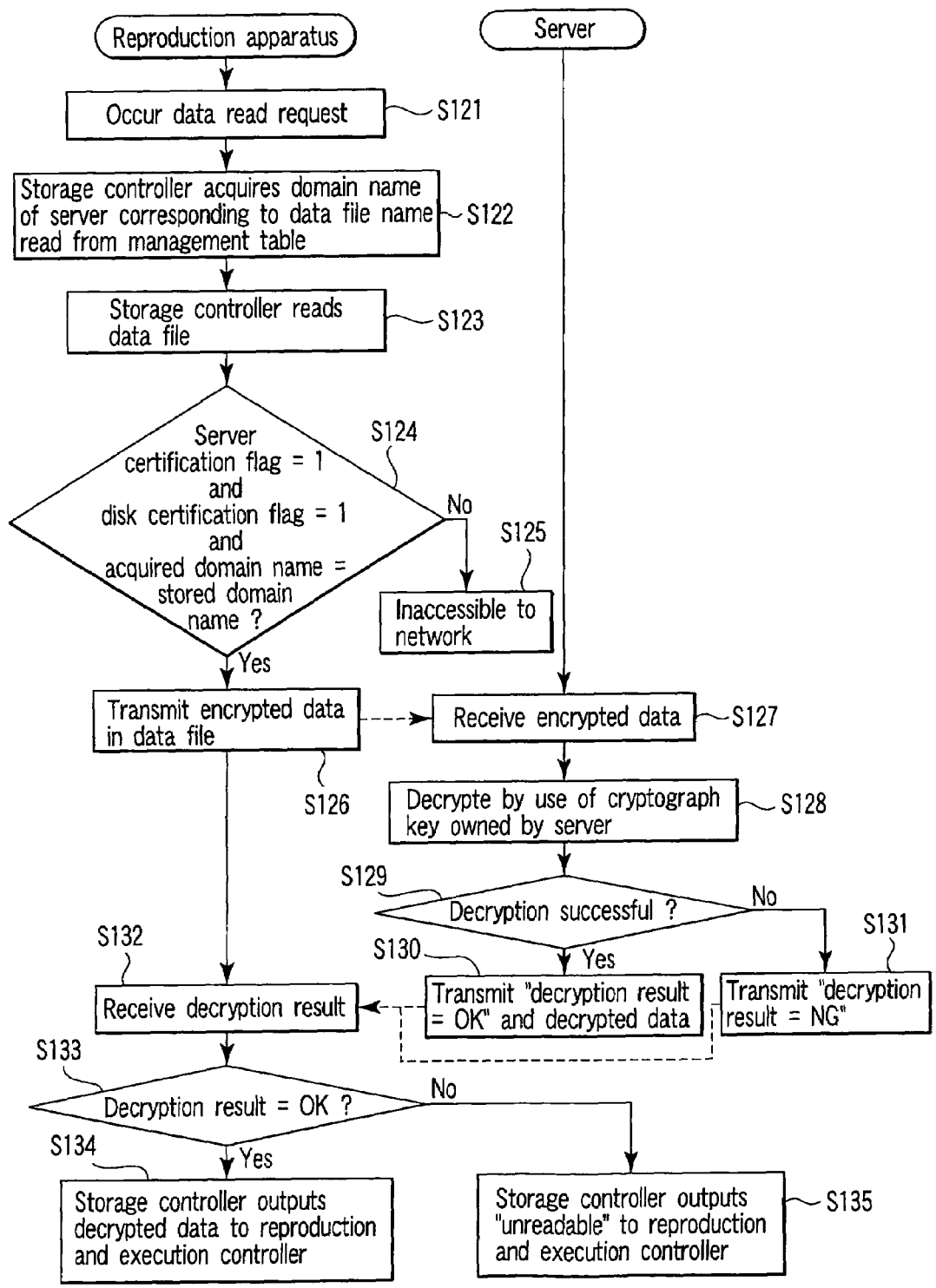
FIG. 12 is a flowchart showing another storage control processing (processing operations of the content reproduction apparatus and the server at the time when the data read request is occurred) performed by the storage controller and the server.

In FIG. 12, when the data readout request is occurred and detected by the storage controller 5 (step S121), the storage controller 5 acquires the domain name of the server corresponding to the data file name to be read with reference to the management table (step S122). Furthermore, the data file having the data file name is read from the memory unit 6 (step S123).

In order to decrypt the data in the read data file, the destination verification unit 22 permits the access to the server corresponding to the domain name recorded in the access management table only in a case where all of three conditions are satisfied: (first condition) the server certification flag be "1"; (second condition) the disk certification flag be "1"; and (third condition) the domain name acquired in the step S122 should agree with the domain name (domain name read from the specific area of the disk) recorded in the access management table (step S124). When any of the conditions is not satisfied, the network is not accessed. Therefore, any data is not read from the memory unit 6 (step S125).

In a case where the destination verification unit 22 permits the access to the network, the processing advances to step S126. The communication unit 4 connects the reproduction apparatus 100 to the server corresponding to the domain name registered in the destination table. The storage controller 5 transmits the encrypted data in the read data file to the server via the communication unit 4 (step S126).

On receiving the encrypted data (step S127), the server decrypt the data by use of the secret key stored beforehand in the server and the same encryption system as that in encrypting the data in the step S106 of FIG. 11 (step S128). When the decrypting is successful (step S129), the decrypted data is transmitted together with decrypting result "OK" to the reproduction apparatus (step S130). When the decrypting fails (step S129), decrypting result "NG" is transmitted to the reproduction apparatus (step S131).

In the reproduction apparatus 100, on receiving the decrypting result (step S132), the storage controller 5 outputs the decrypted data to the reproduction/execution controller 3 (step S134) in a case where the decrypting result is "OK" (step S133). In a case where the decrypting result is "NG" (step S133), the storage controller 5 discards the data in the data file read from the memory unit 6, and outputs a message indicating "unreadable" to the reproduction/execution controller 3 (step S135).

In the storage control described above, any data cannot be written or read in a case where the server (network) is not accessed. There will be described hereinafter a processing system to write and read the data in a case where the server (network) is not accessed.

First, write processing will be described. In a case where it determined that the access to the network is impossible in the step S64 of FIG. 9 and the step S103 of FIG. 11, a certification confirmation flag stored beforehand in the storage controller 5 is read. The certification confirmation flag indicates whether or not to read/write the data in a case where it is impossible to access the network. When the certification confirmation flag is "1", the reading/writing is permitted even when the access to the network is impossible, when the certification confirmation flag is "0", the reading/writing is not permitted when the access to the network is impossible.

In a case where the certification confirmation flag is "1", the storage controller 5 writes the data into the memory unit 6 without generating the certificate or encrypting (i.e., the certificate file name or the server domain name is vacant in the management table). In a case where the value is "0", any data is not written.

As to the read processing, in the same manner as in the write processing, when it is determined that the access to the network is impossible in the step S80 of FIG. 10 and the step S125 of FIG. 12, the certification confirmation flag stored beforehand in the storage controller 5 is read. In a case where the certification confirmation flag is "1", the storage controller 5 reads the data from the memory unit 6 without verifying the certificate or decrypting, and outputs the data to the reproduction/execution controller 3. In a case where the value is "0", any data is not read.

In the above description, the certification confirmation flag is used in common in both of the write and read processing, but separate certification confirmation flags may be prepared for the writing and the reading.

Moreover, in the write processing, when the write request is detected, the certification confirmation flag stored in the storage controller 5 is read. When the certification confirmation flag is "1" which indicate that the reading/writing is permitted without generating the certificate or encrypting, regardless of accessibility to the network, the data is written into the memory unit 6 without generating the certificate or encrypting (i.e., the certificate file name and the server domain name is vacant in the management table). When the certification confirmation flag is "0", the data is written after generating the certificate or encrypting as described above. Here, when the server cannot be accessed (step S64 of FIG. 9, step S103 of FIG. 11), such data is not written.

Furthermore, when the readout request is detected in the read processing, the certification confirmation flag stored in the storage controller 5 is read. When the certification confirmation flag is "1" which indicate that the reading is permitted without verifying the certificate or decrypting, the storage controller 5 outputs, to the reproduction/execution controller 3, data read from the memory unit 6 without verifying the certificate or decrypting, regardless of accessibility to the network. When the certification confirmation flag is "0", the data read from the memory unit 6 is subjected to the verifying the certificate or decrypting, and output to the reproduction/execution controller 3 as described above.

In the above description, the certification confirmation flag is used in common in both of the write and read processing, but separate certification confirmation flags may be prepared for the writing and the reading.

<Storage Control by Storage Controller and Content Protection Unit>

The storage control is performed between the storage controller 5 and the server. Such storage control may be performed inside the content reproduction apparatus 100.

Figure 13:
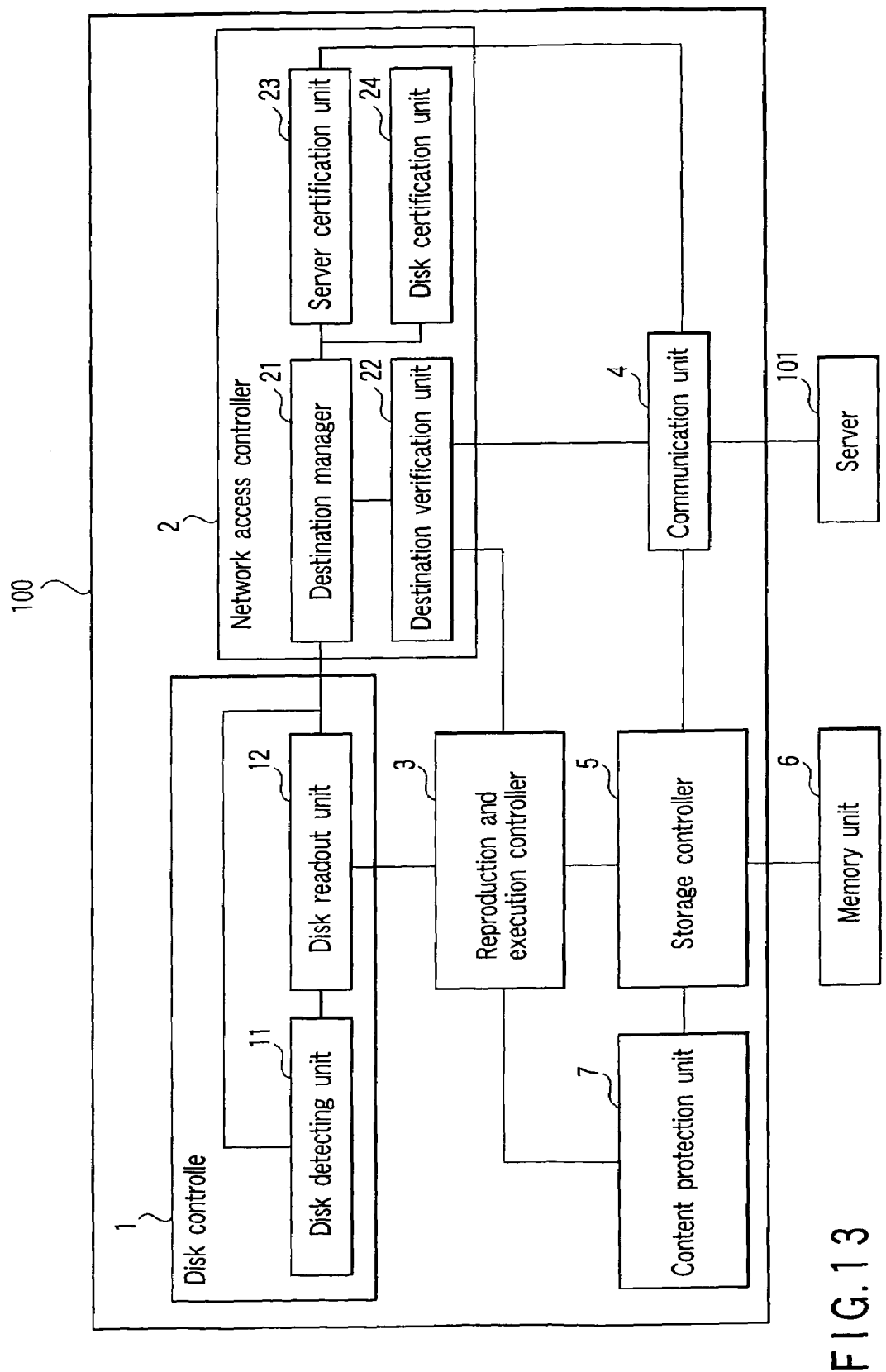
FIG. 13 is a diagram showing another constitution example of the content reproduction apparatus.

For example, when the content on the disk is encrypted in accordance with a content protection technology such as an advanced access content system (AACS), the key used in the encryption is concealed on the disk, and the reproduction apparatus 100 reproduces the content by use of the key, as shown in FIG. 13, the reproduction apparatus 100 has a content protection unit 7 to encrypt or decrypt data by use of the key concealed on the disk.

In the reproduction apparatus shown in FIG. 13, the content protection unit 7 is used, and the storage control is performed by this content protection unit 7 and a memory unit 6.

First, there will be described storage control (corresponding to FIGS. 9 and 10) to perform certification in reading the data stored in the memory unit 6, with reference to flowcharts shown in FIGS. 14 and 15.

There will be described a case where a data write request is occurred when the content on the disk is reproduced by the reproduction apparatus 100 with reference to the flowchart shown in FIG. 14. It is to be noted that in FIG. 14, the same parts as those of FIG. 9 are denoted with the same reference numerals, and an only different part will be described.

Figure 14:
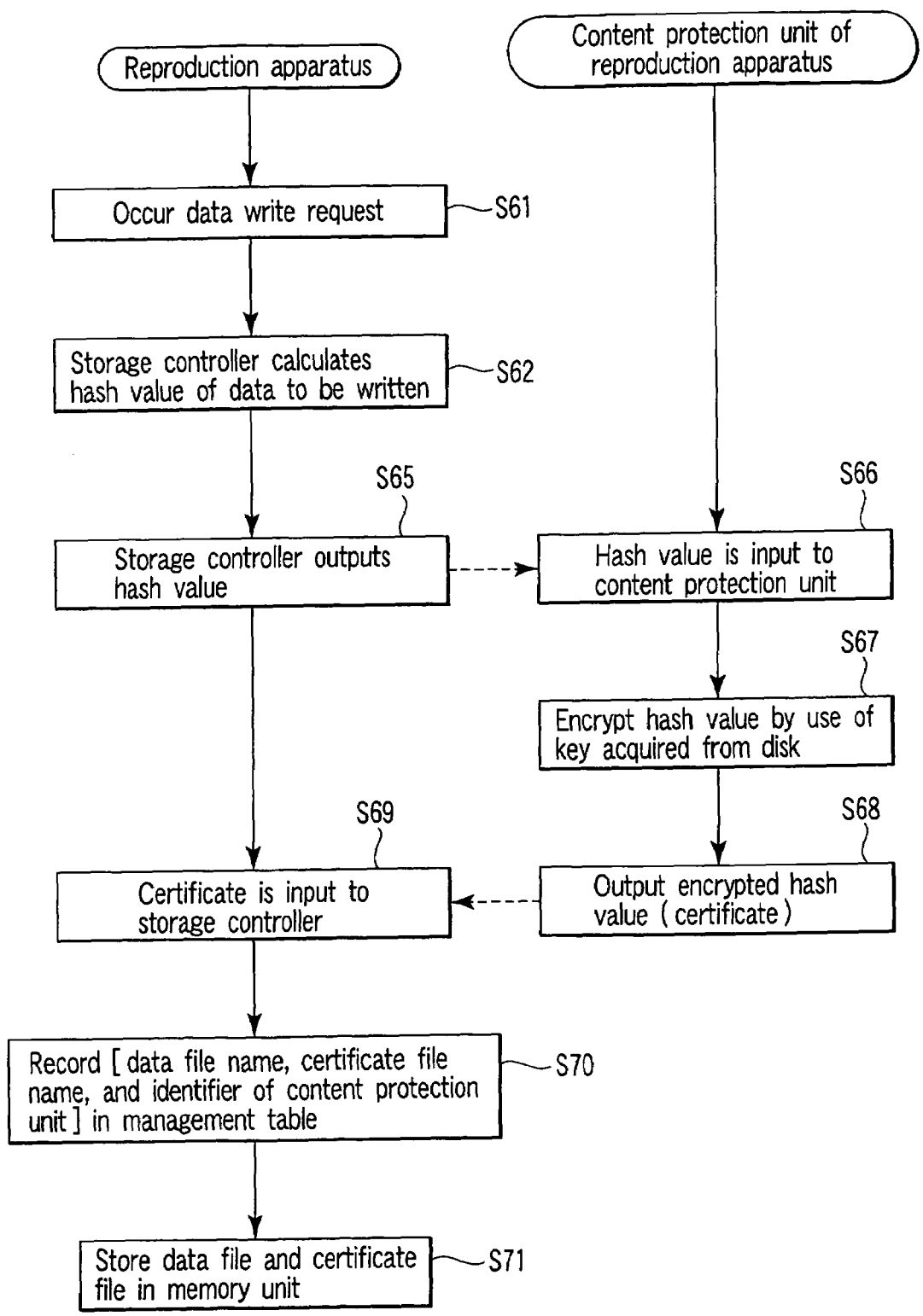
FIG. 14 is a flowchart showing a storage control (processing operations of a storage controller and a content protection unit at a time when a data write request is occurred) performed by the storage controller and the content protection unit.

In FIG. 14, it is not necessary to access the network. Therefore, the steps S63 and S64 of FIG. 9 are omitted. That is, in FIG. 14, when the data write request is occurred (step S61), and the storage controller 5 calculates the hash value of the data to be written (step S62), the hash value is output to the content protection unit 7 (step S65).

When the hash value is input into the content protection unit 7 (step S66), the hash value is encrypted using the key acquired from the disk being reproduced and a predetermined encryption scheme (step S67), and the encrypted hash value is output as a certificate to the storage controller 5 (step S68).

When the certificate is input into the storage controller 5 (step S69), the storage controller 5 records the file name (data file name) of the data to be written, the file name (certificate file name) of the received certificate data, and an identifier of the content protection unit 7 which has performed the encryption as one set of records in the management table in the memory area of the storage controller 5 (step S70). Furthermore, the data (data file) to be written into the memory unit 6, and the received certificate (certificate file) are stored in the memory unit 6 (step S71).

Here, the records recorded in the management table have a form similar to that in FIG. 9. The identifier indicating that a subject which has performed the encryption for generating the certificate is the server or the content protection unit 7 is written, and accordingly the reproduction apparatus can perform both of the storage control shown in FIGS. 9 and 10 and the storage control shown in FIGS. 14 and 15. When the reproduction apparatus performs the only storage control shown in FIG. 14 of FIGS. 9 and 14, it is not necessary to record the identifier of the content protection unit 7 in the management table.

Next, there will be described a case where a data readout request with respect to the data stored in the memory unit 6 as shown in FIG. 14 is occurred, when the content on the disk is reproduced by the reproduction apparatus 100 with reference to the flowchart shown in FIG. 15. It is to be noted that in FIG. 15, the same parts as those of FIG. 10 are denoted with the same reference numerals, and an only different part will be described.

Figure 15:
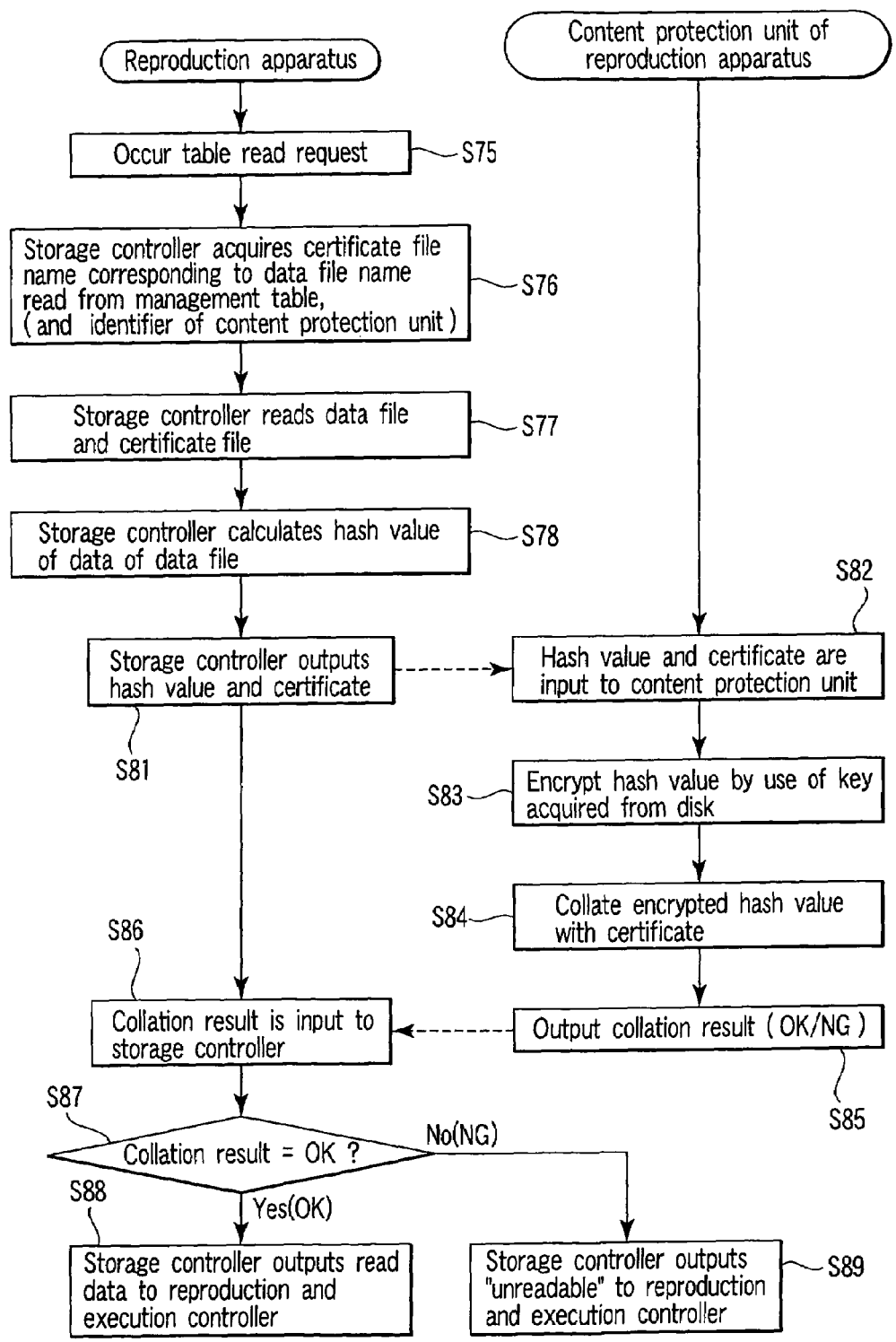
FIG. 15 is a flowchart showing a storage control (processing operations of the storage controller and the content protection unit at a time when a data read request is occurred) performed by the storage controller and the content protection unit.

In FIG. 15, it is not necessary to access the network. Therefore, the steps S79 and S80 of FIG. 10 are omitted. That is, in FIG. 15, the data readout request is occurred (step S75), and the storage controller 5 acquires, from the management table, the certificate file corresponding to the data file name to be read and the identifier of the content protection unit 7 (step S76). Furthermore, the storage controller 5 reads the data file having the data file name, and the certificate file corresponding to the certificate file name (step S77), and calculates the hash value of the data in the read data file (step S78). In this case, since the identifier of the content protection unit 7 is acquired from the management table, the hash value and the read certificate are output to the content protection unit 7 (step S81).

It is to be noted that the processing is similar to that of FIG. 10 in a case where the identifier (domain name) of the server is acquired from the management table in step S76.

When the hash value and the certificate are input into the content protection unit 7 (step S82), the input hash value is encrypted using the key acquired from the disk being reproduced and the same encryption scheme as that in encrypting the value in the step S67 of FIG. 14 (step S83), and the encrypted hash value is collated with the input certificate (step S84). When the encrypted hash value agrees with the input certificate, the collation result "OK" is output to the storage controller 5. When both of them differ from each other, the collation result "NG" is output to the storage controller 5 (step S85).

When the collation result is input into the storage controller 5 (step S86), and the collation result is "OK" (step S87), the storage controller 5 outputs the data in the data file read from the memory unit 6 to the reproduction/execution controller 3 (step S88). When the collation result is "NG" (step S87), the storage controller 5 discards the data in the data file read from the memory unit 6 instead of outputting the data to the reproduction/execution controller 3, and outputs a message indicating "unreadable" to the reproduction/execution controller 3 (step S89).

Next, there will be described the storage control (corresponding to FIGS. 11 and 12) to encrypt the data and store the data encrypted in the memory unit 6, with reference to flowcharts shown in FIGS. 16 and 17.

There will be described a case where the data write request is occurred, when the content on the disk is reproduced by the content reproduction apparatus 100 with reference to the flowchart shown in FIG. 16. It is to be noted that in FIG. 16, the same parts as those of FIG. 11 are denoted with the same reference numerals, and an only different part will be described.

Figure 16:
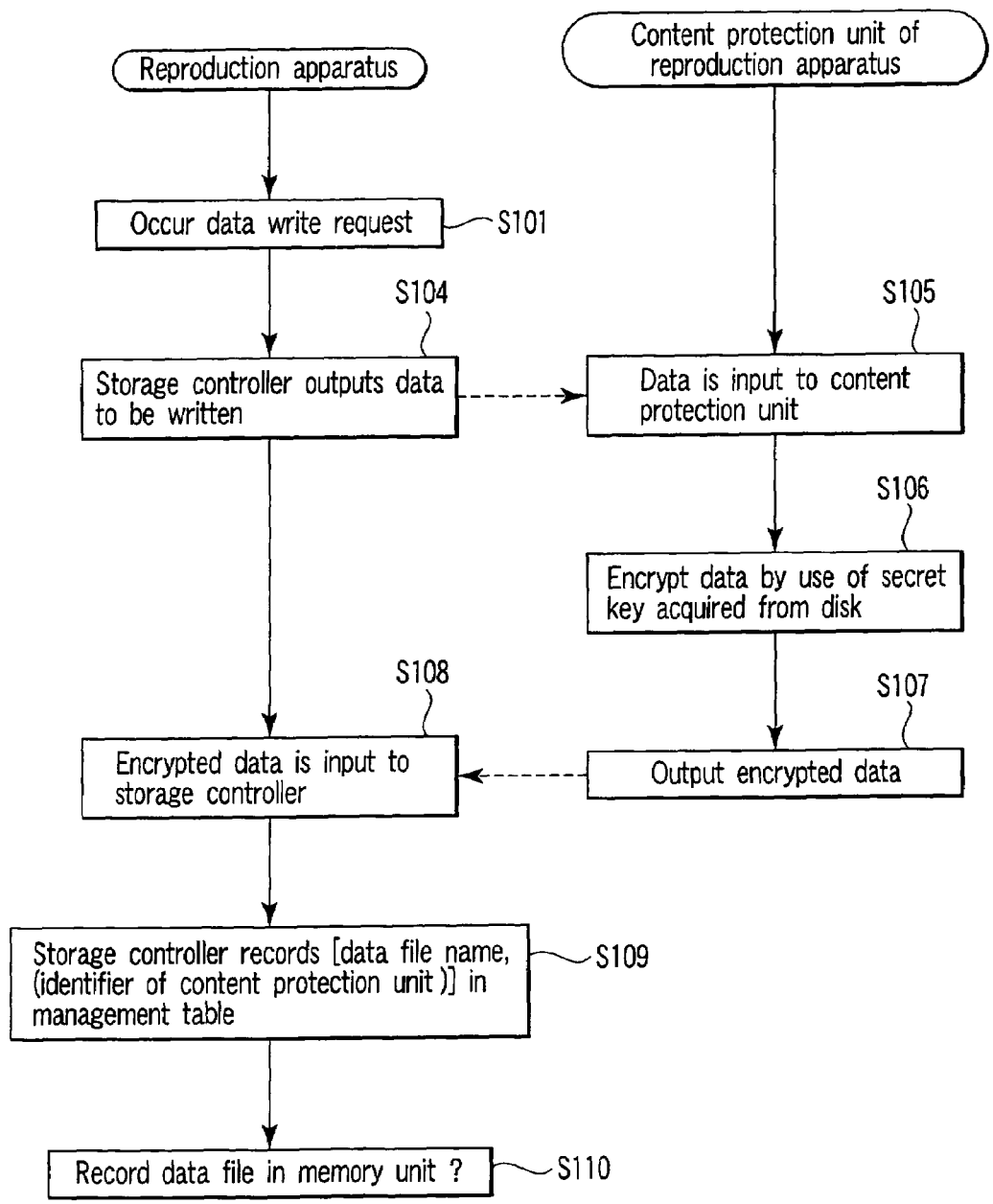
FIG. 16 is a flowchart showing another storage control (processing operations of the storage controller and the content protection unit at the time when the data write request is occurred) performed by the storage controller and the content protection unit.

In FIG. 16, it is not necessary to access the network. Therefore, the steps S102 and S103 of FIG. 11 are omitted. That is, in FIG. 16, when the data write request is occurred (step S101), the storage controller 5 outputs the data to be written to the content protection unit 7 (step S104).

When the data is input into the content protection unit 7 (step S105), the input data is encrypted using the key acquired from the disk being reproduced (step S106), and the encrypted data is output to the storage controller 5 (step S107).

When the encrypted data is input into the storage controller 5 (step S108), the storage controller 5 records the file name (data file name) of the encrypted data and the identifier of the content protection unit 7 which has performed the encryption as one set of records in the management table (step S109). Furthermore, the storage controller stores the encrypted data (data file) in the memory unit 6 (step S110).

Here, the records recorded in the management table have a form similar to that in FIG. 11. The identifier indicating that a subject that has performed the encryption is the server or the content protection unit 7 is written, and accordingly the reproduction apparatus can perform both of the storage control shown in FIGS. 11 and 12 and the storage control shown in FIGS. 16 and 17. When the reproduction apparatus performs the only storage control shown in FIG. 16 of FIGS. 11 and 16, it is not necessary to record the identifier of the content protection unit 7 in the management table.

Next, there will be described a case where a data readout request with respect to the data stored in the memory unit 6 as shown in FIG. 16 is occurred, when the content on the disk is reproduced by the reproduction apparatus 100 with reference to the flowchart shown in FIG. 17. It is to be noted that in FIG. 17, the same parts as those of FIG. 12 are denoted with the same reference numerals, and an only different part will be described.

Figure 17:
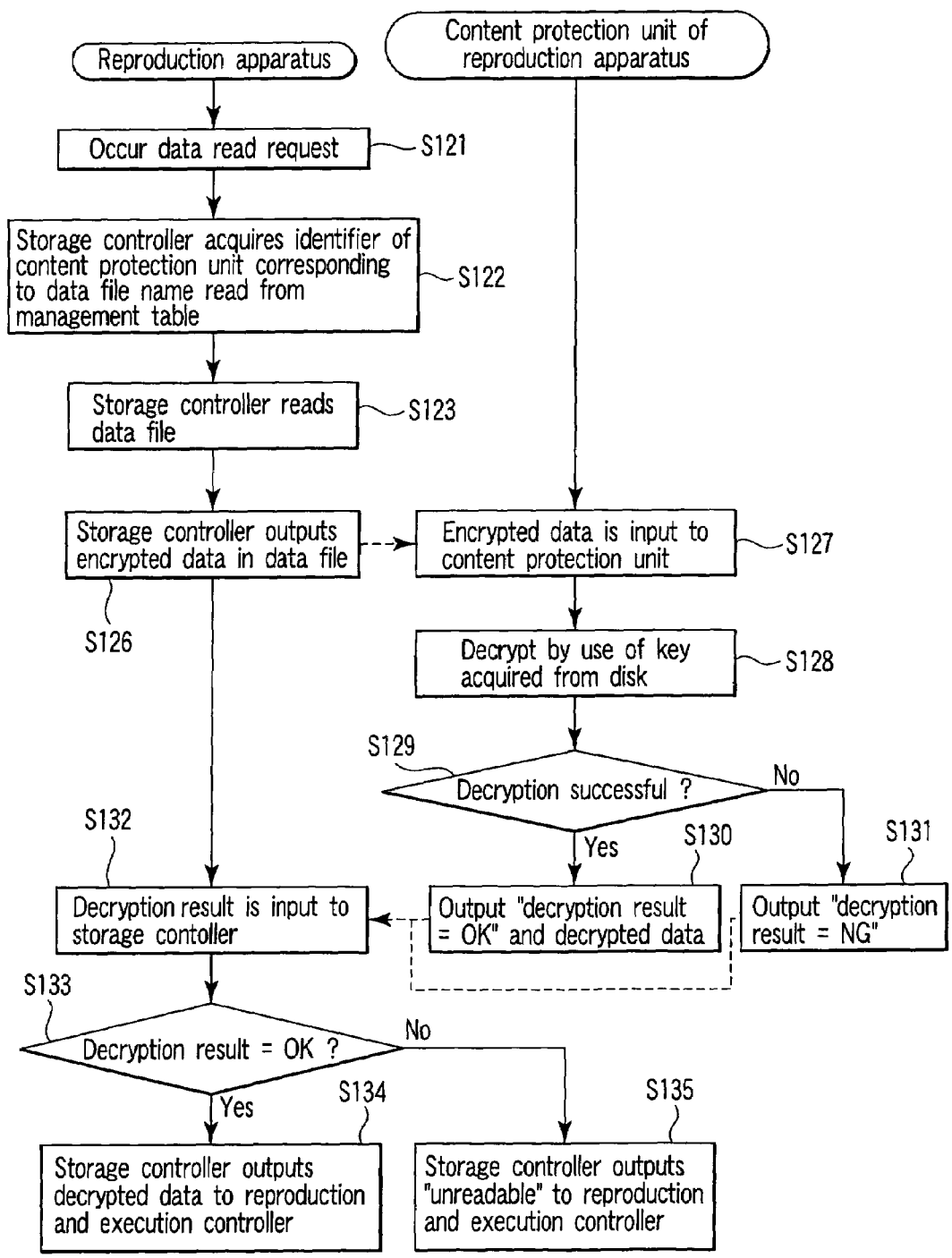
FIG. 17 is a flowchart showing another storage control (processing operations of the storage controller and the content protection unit at the time when the data read request is occurred) performed by the storage controller and the content protection unit.

In FIG. 17, it is not necessary to access the network. Therefore, the steps S124 and S125 of FIG. 12 are omitted. That is, in FIG. 17, when the data readout request is occurred (step S121), the storage controller 5 acquires, from the management table, the identifier of the content protection unit corresponding to the data file name to be read (step S122), and reads the data file having the data file name from the memory unit 6 (step S123). In this case, since the identifier of the content protection unit 7 is acquired from the management table, the storage controller 5 outputs the encrypted data of the read data file to the content protection unit 7 (step S126).

When the encrypted data is input into the content protection unit 7 (step S127), the content protection unit 7 decrypts the data by use of the key acquired from the disk being reproduced and the same encryption scheme as that in encrypting the data in the step S106 of FIG. 16 (step S128). When the decrypting is successful (step S129), the decrypted data is output together with the decrypting result "OK" to the storage controller 5 (step S130). When the decrypting fails (step S129), the collation result "NG" is output to the storage controller 5 (step S131).

When the decrypting result is input into the storage controller 5 (step S132) and the decrypting result is "OK" (step S133), the storage controller 5 outputs the decrypted data to the reproduction/execution controller 3 (step S134). When the decrypting result is "NG" (step S133), the storage controller 5 discards the data in the data file read from the memory unit 6, and outputs a message indicating "unreadable" to the reproduction/execution controller 3 (step S135).

In the above-described storage control by the storage controller 5 and the server and that by the storage controller 5 and the content protection unit 7, there have described the case where the certification is performed by use of the certificate of the data when the data stored in the memory unit 6 is read, and the case where the data stored in the memory unit 6 is encrypted, but they may be combined to perform the storage control.

For example, when arbitrary data is written into the memory unit 6, the storage controller 5 transfers the data and the hash value of the data to the server or the content protection unit 7. The server or the content protection unit 7 encrypts the received hash value to generate the certificate. Moreover, the received data is encrypted, and the generated certificate and the encrypted data are returned to the storage controller 5. The storage controller 5 stores the received certificate and the encrypted data in the memory unit 6.

When the data is read from the memory unit 6, the storage controller 5 reads the encrypted data and the certificate stored in the memory unit 6, and transfers them to the server or the content protection unit 7. After decrypting the encrypted data, the server or the content protection unit 7 calculates the hash value, and further encrypts the hash value. The server or the content protection unit 7 collates the encrypted hash value with the certificate. When both of them agree with each other, the decrypted data is returned to the storage controller 5. The storage controller 5 outputs the received data to the reproduction/execution controller 3.

It is to be noted that in the above description, the hash value is used where required, but the hash value is identification information generated from the given data, and an original text cannot be estimated from the generated identification information.

Moreover, there is not any special restriction on the memory unit 6, and a detachable recording medium such as a hard disk or a memory card, an arbitrary storage device connected to the network and the like may be used.

When the disk detection unit 11 detects that the disk has been inserted, the destination management unit 21 reads the domain name from the specific area of the disk, and the domain name is stored in the destination management table. When the disk detection unit 11 thereafter detects that the disk has been removed, the destination management unit 21 deletes the domain name from the destination management table. Moreover, In the case that the network access request is detected, the server corresponding to the domain name stored in the destination management table is accessed, and thereafter the communication with the server is disconnected for a certain reason, while the disk is inserted into the reproduction apparatus 100, the domain names are deleted from the destination management table. In this case, when the server certification flag and the disk certification flag stored in the destination management table are "1", they may be rewritten into "0".

According to the present embodiment, when the disk is inserted into the reproduction apparatus, the identifier (domain name) indicating the server on the network is read from the predetermined specific storage area of the disk, and stored in the destination management table. When the request for the access to a destination on the network is detected during the reproduction or the execution of the content data including the video/audio data and the program stored on the disk, the server corresponding to the domain name stored in the destination management table is accessed in a case where the identifier (domain name) of the destination agrees with the domain name stored in the destination management table, the server corresponding to the domain name stored in the destination management table is determined to be valid, and the disk is determined to be valid. According to the reproduction apparatus constituted in this manner, the execution or the reproduction of the disk on which the tampered content data is recorded is avoided, and the server to be accessed during the reproduction or the execution of the content data or the program recorded on the disk can be limited to that corresponding to the domain name stored in the specific area of the disk.

Since the server certification unit 22 determines whether the server on the network is valid and the disc certification unit 24 determines whether the disc is valid, it is possible to securely acquire or reproduce video information related to the content on the disk via the internet. Since the accessible server is limited, a maliciously prepared dangerous content cannot be connected to the unspecified number of the servers. Therefore, the apparatus 100 can be prevented from becoming the steppingstone for DDoS attack. It is possible to avoid damages caused by reproducing the dangerous content, and it is also possible to prevent the apparatus 100 from becoming a perpetrator of attack on another server.

The technology of the present invention described in the embodiment of the present invention can be stored and distributed as a program executable by a computer in a recording medium such as a magnetic disk (flexible disk, hard disk or the like), an optical disk (CD-ROM, DVD or the like), or a semiconductor memory.

For example, when it is prepared the computer that is provided with: reproduction/execution means (disk controller 1, reproduction/execution controller 3) for reproducing and executing the content data stored in the recording medium which stores the content data including the video/sound data and the program and which stores the identifier indicating the server on the network in the predetermined specific storage area; storage means; and the communication unit 4, and when the computer executes the program for allowing the computer to realize the functions of the network access controller 2, the storage controller 6, and the content protection unit 7, the content reproduction apparatus of FIG. 1 can be realized.

The present invention is applied to a content reproduction apparatus which reproduces and executes content data including video/audio information and a program recorded on a recording medium such as an optical disk.

What is claimed is:

1. A content reproduction apparatus comprising:
   a readout unit configured to read, from a recording medium which includes a specific area storing a specific server identifier and another area storing a content data item including a destination identifier used for server accessing while the content item is reproduced, the specific server identifier indicating a server allowed to be accessed while the content data item is reproduced;
   a table to store the specific server identifier read from the recording medium;
   a first certification unit configured to certify a server corresponding to the specific server identifier;
   a second certification unit configured to certify the content data item in the recording medium by use of a portion of the content data item with the another area, the portion being designated by the server being certified;
   a reproduction unit configured to reproduce the content data item stored in the recording medium, to occur a server access request including the destination identifier while reproducing the content data item;
   an acquiring unit configured to acquire the destination identifier when the server access is occurred;
   a determination unit configured to determine whether the destination identifier being acquired is equal to the specific identifier stored in the table; and
   an accessing unit configured to access to the server when the destination identifier being acquired is equal to the specific server identifier, and the server and the content data item in the recording medium are certified.

2. The content reproduction apparatus according to claim 1, wherein the second certification unit includes:
   a generation unit configured to generate a first identification information item from the portion designated by the server being certified;
   a transmitting unit configured to transmit the first identification information item to the server; and
   a receiving unit configured to receive, from the server, a determination result indicating the content data item in the recording medium is certified or not.

3. The content reproduction apparatus according to claim 1, wherein the readout unit reads the specific server identifier from the recording medium when the recording medium is inserted into the content reproduction apparatus.

4. The content reproduction apparatus according to claim 1, wherein the second certification unit certifies when the destination identifier being acquired is equal to the specific server identifier stored in the table, and the second certification unit certifies when the server is certified.

5. The content reproduction apparatus according to claim 1, wherein the server corresponding to the specific server identifier is a predetermined specific server corresponding to the content data item stored in the recording medium, when the destination identifier is equal to the specific server identifier, and the server and the recording medium are certified.

6. The content reproduction apparatus according to claim 2, wherein the portion designated by the server is a program.

7. The content reproduction apparatus according to claim 2, wherein the generation unit generates the first identification information item from a data series transmitted from the server and the portion designated by the server.

8. The content reproduction apparatus according to claim 1, further comprising:
   a first detection unit configured to detect a write request for write a designated data item into a storage unit, while the reproduction unit reproduces the content data item;
   a storage control unit configured to (a) generate an identification information item of the designated data item, (b) encrypt the generated identification information item, to obtain a certificate of the designated data item, and (c) store the designated data item and the certificate in the storage unit.

9. The content reproduction apparatus according to claim 8, further comprising:
   a second detection unit configures to detect a readout request for reading a designated data item from the storage unit, while the reproduction unit reproduces the content data item;
   a readout control unit configured to (a) read the designated data item and its certificate from the storage unit, (b) generate an identification information item of the read designated data item, (c) encrypt the generated identification information item, to obtain encrypted identification information item, and (d) output the read designated data item to the reproduction unit, when the encrypted identification information item is equal to the certificate.

10. The content reproduction apparatus according to claim 1, further comprising:
    a first detection unit configures to detect a write request for writing a designated data item into a storage unit, while the reproduction unit reproduces the content data item;
    a storage control unit configured to (a) encrypt the designated data item, to obtain encrypted data item, and (b) store the encrypted data item in the storage unit.

11. The content reproduction apparatus according to claim 10, further comprising:
    a second detection unit configured to detect a readout request for reading a designated data item from the storage unit, while the reproduction unit reproduces the content data item;
    a readout control unit configured to (a) read the designated data item from the storage unit, (b) decrypt the read designated data item, to obtain a decrypted data item, and (c) output the decrypted data item to the reproduction unit.

12. The content reproduction apparatus according to claim 1, further comprising:
    a first detection unit configured to detect a write request for writing a designated data item into a storage unit, while the reproduction unit reproduces the content data item;

a first storage control unit configured to (a) generate an identification information item of the designated data item, (b) transmit the generated identification information item to the server accessed by the means for accessing, (c) receive a certificate of the designated data item from the server, the certificate being generated based on the generated identification information item; and (d) store the designated data item and the certificate in the storage unit.

13. The content reproduction apparatus according to claim 12, further comprising:
   a second detection unit configured to detect a readout request for reading a designated data item from the storage unit, while the reproduction unit reproduces the content data item;
   a first readout control unit configured to (a) read the designated data item and its certificate from the storage unit, (b) generate an identification information item of the read designated data item, (c) transmit the generated identification information item and its certificate to the server accessed by the accessing unit, (d) receive, from the server, a determination result indicating the read designated data item is valid or not, and (e) output the read designated data item to the reproduction unit, when the determination result indicating that the read designated data item is valid is received.

14. The content reproduction apparatus according to claim 1, further comprising:
   a first detection unit configured to detect a write request for writing a designated data item into a storage unit, while the reproduction unit reproduces the content data item;
   a first storage control unit configured to (a) transmit the designated data item to the server accessed by the accessing unit, (b) receive an encrypted data item from the server, the encrypted data item being generated by encrypting the designated data item; and (c) store the encrypted data item into the storage unit.

15. The content reproduction apparatus according to claim 14, further comprising:
   a second detection unit configured to detect a readout request for reading a designated data item from the storage unit, while the reproduction unit reproduces the content data item;
   a first readout control unit configured to (a) read a designated data item from the storage unit, (b) transmit the read designated data item to the server accessed by the accessing unit, (c) receive a decrypted data item from the server, the decrypted data item being generated by decrypting the read designated data item, and (d) output the received decrypted data item to the reproduction unit.

16. The content reproduction apparatus according to claim 2, wherein the receiving unit receives a valid period of the recording medium together with the determination result indicating the content data item in the recording medium is certified, and
   the second certification unit certifies, when the valid period elapses or a predetermined user operation is performed.

17. The content reproduction apparatus according to claim 2, wherein the receiving unit receives an identification data item of the content reproduction apparatus together with the determination result indicating the content data item in the recording medium is certified, and stores the identification data item in a memory, and further comprising
   a second transmitting unit configured to transmit the identification data item to the server accessed by the accessing unit.

18. The content reproduction apparatus according to claim 17, wherein the receiving unit further receives a valid period of the recording medium, and
   the identification data item is deleted from the memory when the valid period elapses or a predetermined user operation is performed.

19. The content reproduction apparatus according to claim 1, wherein the second certification unit certifies the content data item in the recording medium, periodically or at random times.

20. The content reproduction apparatus according to claim 12, further comprising:
   a first memory to store a first flag indicating that writing the designated data item into the storage unit without its certificate is permitted; and
   a second storage control unit configured to store the designated data item without its certificate in the storage unit when the first detection unit detects the write request and the first flag is stored.

21. The content reproduction apparatus according to claim 13, further comprising:
   a second memory to store a second flag indicating that outputting the designated data item stored in the storage unit without determining whether the designated data item is valid; and
   a second readout control unit configured to read the designated data item from the storage unit and output the read designated data item to the reproduction unit when the second detection unit detects the readout request and the second flag is stored.

22. The content reproduction apparatus according to claim 14, further comprising:
   a first memory to store a third flag indicating that writing the designated data item into the storage unit without encrypting is permitted; and
   a second storage control unit configured to store the designated data item in the storage unit when the first detection unit detects the write request and the third flag is stored.

23. The content reproduction apparatus according to claim 15, further comprising:
   a second memory to store a fourth flag indicating that outputting of the designated data item stored in the storage unit without decrypting is permitted; and
   a second readout control unit configured to read the designated data item from the storage unit, and output the read designated data item to the reproduction unit when the second detection unit detects the readout request and the fourth flag is stored.

24. A content reproduction method comprising:
   reading a specific server identifier, from a recording medium which include a specific area storing a specific server identifier and another area storing a content data item including a destination identifier used for server accessing while the content data item is reproduced, the specific server identifier indicating a server allowed to be accessed while the content data item is reproduced, to store the specific server identifier in a table;
   certifying a server corresponding to the specific server identifier;
   certifying the content data item in the recording medium by use of a portion of the content data item within the another area, the portion being designated by the server being certified;

reproducing the content data item stored in the recording medium, to occur a server access request including the destination identifier while reproducing the content data item;

acquiring the destination identifier when the server access request is occurred;

determining whether the destination identifier being acquired is equal to the specific identifier stored in the table;

accessing to the server when the destination identifier being acquired is equal to the specific server identifier, and the server and the content data item in the recording medium are certified.

25. A computer program stored on a computer readable medium, the computer including a reproduction unit configured to reproduce, from a recoding medium which includes a specific area storing a specific server identifier and another area storing a content data item including a destination identifier used for server accessing while the content data item is reproduced, the specific server identifier indicating a server allowed to be accessed while the content data item is reproduced, to occur a server access request including the destination identifier, the computer program comprising:

first program instruction means for instructing the computer to read the specific server identifier from the specific area in the recording medium;

second program instruction means for instructing the computer to store the read specific identifier in a table;

third program instruction means for instructing the computer to certify a server corresponding to the specific server identifier;

fourth program instruction means for instructing the computer to certify the content data item in the recording medium by use of a portion of the content data item, the portion being designated by the server being certified;

fifth program instruction means for instructing the computer to acquire the destination identifier when the server access request is occurred while the reproduction unit reproduces the content data item;

sixth program instruction means for instructing the computer to determine whether the destination identifier being acquired is equal to the specific identifier stored in the table; and seventh program instruction means for instructing the computer to access to the server when the destination identifier being acquired is equal to the specific server identifier, and the server and the content data item in the recording medium are certified.

* * * * *